US012293150B2

(12) United States Patent
Andou et al.

(10) Patent No.: US 12,293,150 B2
(45) Date of Patent: May 6, 2025

(54) POSTED INFORMATION EXTRACTION CONTROL DEVICE AND COMPUTER READABLE STORAGE MEDIUM

(71) Applicant: TAKENAKA CORPORATION, Osaka (JP)

(72) Inventors: Kuniaki Andou, Inzai (JP); Rikuto Kunimoto, Inzai (JP); Takeshi Takai, Inzai (JP); Kazuo Ohtake, Inzai (JP)

(73) Assignee: Takenaka Corporation (JP)

( * ) Notice: Subject to any disclaimer, the term of this patent is extended or adjusted under 35 U.S.C. 154(b) by 798 days.

(21) Appl. No.: 17/253,087

(22) PCT Filed: Jun. 17, 2019

(86) PCT No.: PCT/JP2019/023944
§ 371 (c)(1),
(2) Date: Dec. 16, 2020

(87) PCT Pub. No.: WO2019/244849
PCT Pub. Date: Dec. 26, 2019

(65) Prior Publication Data
US 2021/0271814 A1  Sep. 2, 2021

(30) Foreign Application Priority Data

Jun. 19, 2018  (JP) .................................. 2018-116210

(51) Int. Cl.
*G06F 40/253* (2020.01)
*G06F 16/353* (2025.01)
(Continued)

(52) U.S. Cl.
CPC .......... *G06F 40/253* (2020.01); *G06F 16/353* (2019.01); *G06F 16/387* (2019.01);
(Continued)

(58) Field of Classification Search
CPC .................................................... G06Q 10/10
See application file for complete search history.

(56) References Cited

U.S. PATENT DOCUMENTS 10,217,351 B2 *  2/2019  Takamura .............. G06Q 50/01
10,423,688 B1 *  9/2019  Patton .................. G06F 16/9535
(Continued)

FOREIGN PATENT DOCUMENTS

JP     2002222252 A  *  8/2002
JP     2014-142738 A     8/2014
(Continued)

OTHER PUBLICATIONS

H. N. Alshareef and D. Grigoras, "Using Social Media and the Mobile Cloud to Enhance Emergency and Risk Management," 2016 15th International Symposium on Parallel and Distributed Computing (ISPDC), Fuzhou, China, 2016, pp. 92-99, doi: 10.1109/ISPDC.2016.21. (Year: 2016).*

(Continued)

*Primary Examiner* — Richemond Dorvil
*Assistant Examiner* — Alexander G Marlow
(74) *Attorney, Agent, or Firm* — Polsinelli PC

(57) ABSTRACT

A registree management function receives member (user) registration, carries out a survey upon registration, performs category classification for the registered user, learns the classified categories, and the like. A comment analysis function performs text mining on comments acquired from an SNS posted comment server, determines post origin positions identified by the text mining and the level of credibility thereof, and executes evaluation and the like of a target relating to a theme. An information provision function edits a social heat map generated based on the results of analyzing the comments to be provided to the user, and also performs user category management and the like.

7 Claims, 22 Drawing Sheets

(51) Int. Cl.
| | |
|---|---|
| G06F 16/387 | (2019.01) |
| G06F 18/23 | (2023.01) |
| G06F 40/166 | (2020.01) |
| G06F 40/279 | (2020.01) |
| G06Q 50/00 | (2024.01) |
| G06V 10/70 | (2022.01) |
| H04L 51/02 | (2022.01) |
| H04L 51/52 | (2022.01) |

(52) U.S. Cl.
CPC .......... *G06F 40/166* (2020.01); *G06F 40/279* (2020.01); *G06Q 50/01* (2013.01); *H04L 51/02* (2013.01); *H04L 51/52* (2022.05); *G06F 18/23* (2023.01); *G06V 10/70* (2022.01)

(56) References Cited

U.S. PATENT DOCUMENTS

| | | | | |
|---|---|---|---|---|
| 2013/0117362 | A1* | 5/2013 | Sugiura | H04L 67/01 709/203 |
| 2013/0212229 | A1* | 8/2013 | Vastardis | G06F 15/17306 709/219 |
| 2016/0359791 | A1* | 12/2016 | Zhang | G06Q 30/0254 |

FOREIGN PATENT DOCUMENTS

| | | |
|---|---|---|
| JP | 2017-084028 A | 5/2017 |
| JP | 6154908 B2 | 6/2017 |
| WO | 2012011496 A1 | 1/2012 |
| WO | 2014013690 A1 | 1/2014 |
| WO | 2015052785 A1 | 4/2015 |

OTHER PUBLICATIONS

E. D'Andrea, P. Ducange, B. Lazzerini and F. Marcelloni, "Real-Time Detection of Traffic From Twitter Stream Analysis," in IEEE Transactions on Intelligent Transportation Systems, vol. 16, No. 4, pp. 2269-2283, Aug. 2015, doi: 10.1109/TITS.2015.2404431. (Year: 2015).*

Swati Agarwal, Nitish Mittal, and Ashish Sureka. 2018. Potholes and bad road conditions: mining Twitter to extract information on killer roads. In Proceedings of the ACM India Joint International Conference on Data Science and Management of Data. https://doi.org/10.1145/3152494.3152517 (Year: 2018).*

Chenliang Li and Aixin Sun. 2014. Fine-grained location extraction from tweets with temporal awareness. In Proceedings of the 37th international ACM SIGIR conference on Research & development in information retrieval (SIGIR '14). https://doi.org/10.1145/2600428.2609582 (Year: 2014).*

Shaomei Wu, Jeffrey Wieland, Omid Farivar, and Julie Schiller. 2017. Automatic Alt-text: Computer-generated Image Descriptions for Blind Users on a Social Network Service. In Proceedings of the 2017 ACM Conference on Computer Supported Cooperative Work, https://doi.org/10.1145/2998181.2998364 (Year: 2017).*

J. Monteiro, A. Kitamoto and B. Martins, "Situational Awareness from Social Media Photographs Using Automated Image Captioning," 2017 IEEE International Conference on Data Science and Advanced Analytics (DSAA), Tokyo, Japan, 2017, pp. 203-211, doi: 10.1109/DSAA.2017.59. (Year: 2017).*

Li, C. and Sun, A. (2017), Extracting fine-grained location with temporal awareness in tweets: A two-stage approach. Journal of the Association for Information Science and Technology, 68: 1652-1670. https://doi.org/10.1002/asi.23816 (Year: 2017).*

S. K. Endarnoto, S. Pradipta, A. S. Nugroho and J. Purnama, "Traffic Condition Information Extraction & Visualization from Social Media Twitter for Android Mobile Application," Proceedings of the 2011 International Conference on Electrical Engineering and Informatics, doi: 10.1109/ICEEI.2011.6021743. (Year: 2011).*

"Proposal of a visualization system for congestion situation using local tweets in large-scale events", Lecture proceedings of the 80th (2018) national conference, vol. 1, data and web, Information Processing Society of Japan.

Kohgaku-Sha Co., Ltd., "Node-RED' programming for performing device control and network access easily", [3rd] Artificial intelligence bot that explains Twitter posted images, I/O, vol. 42, No. 7.

* cited by examiner

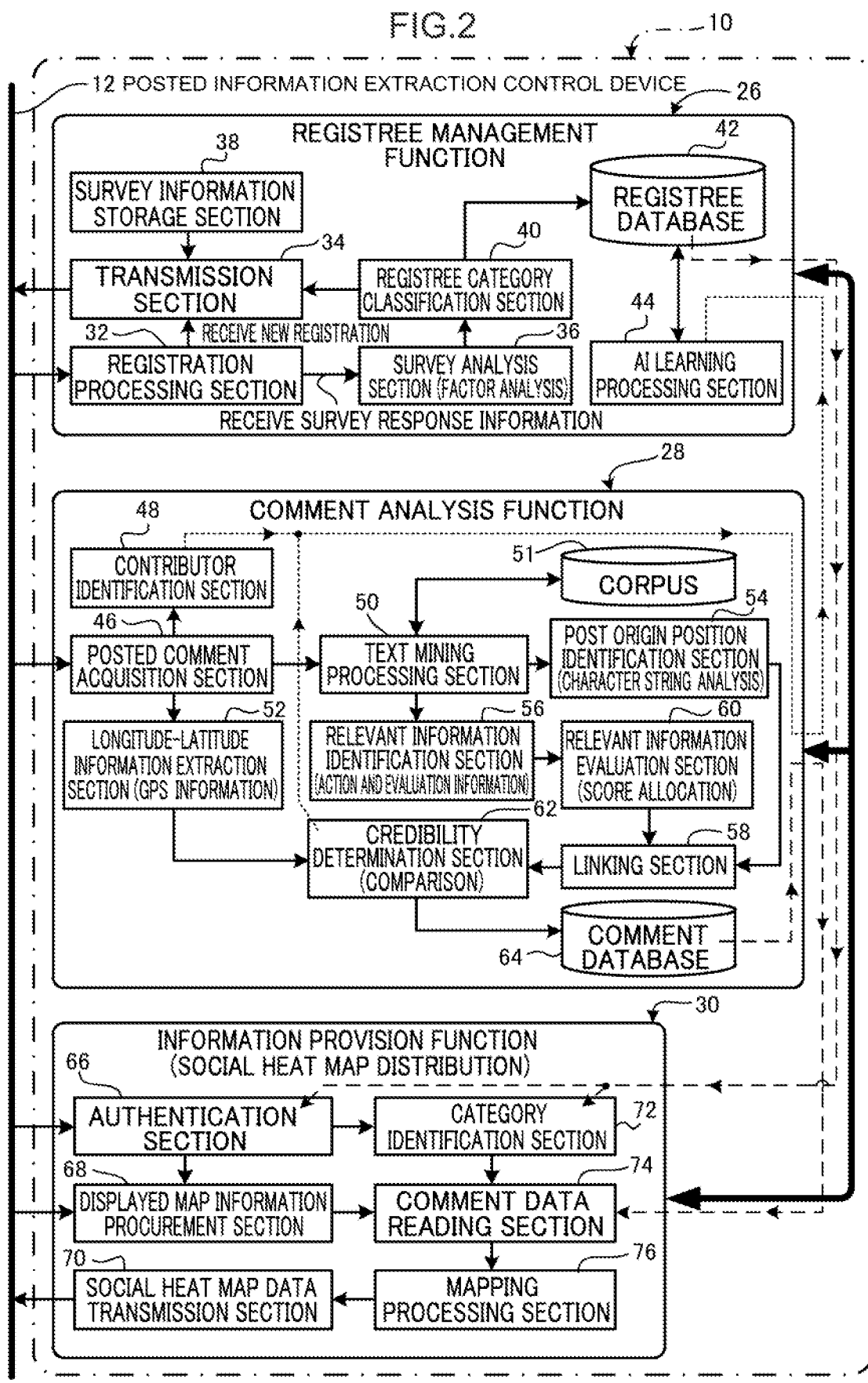

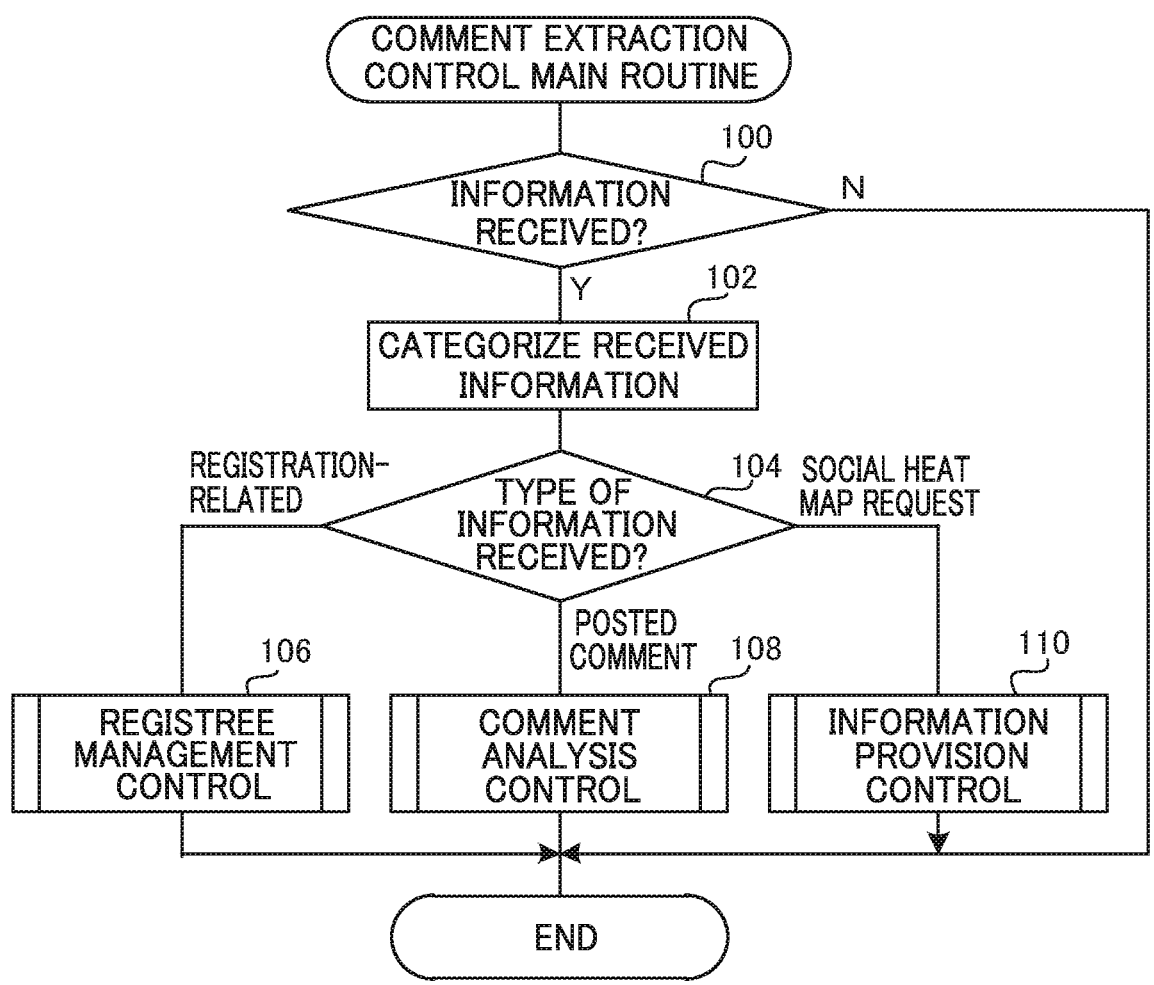

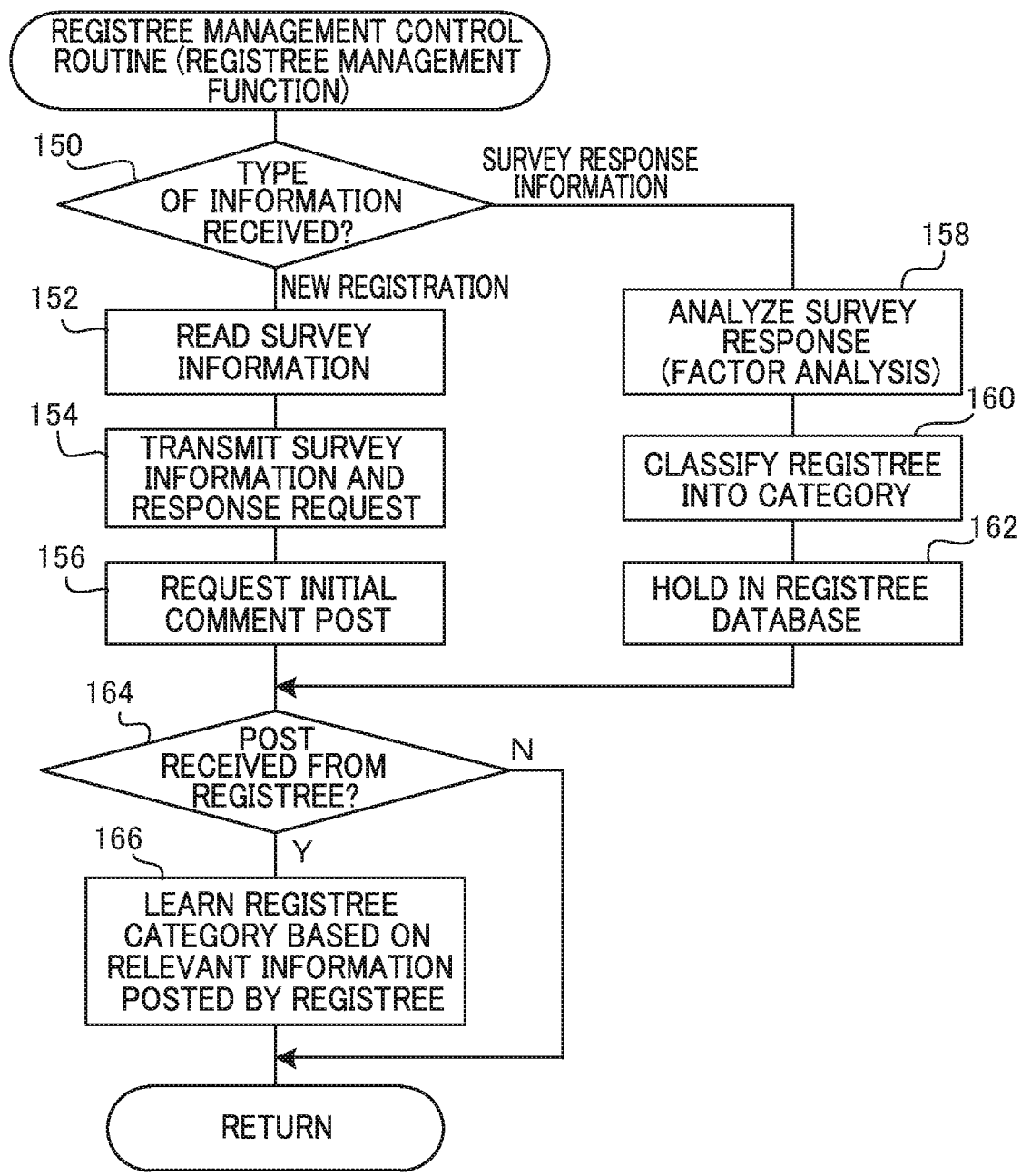

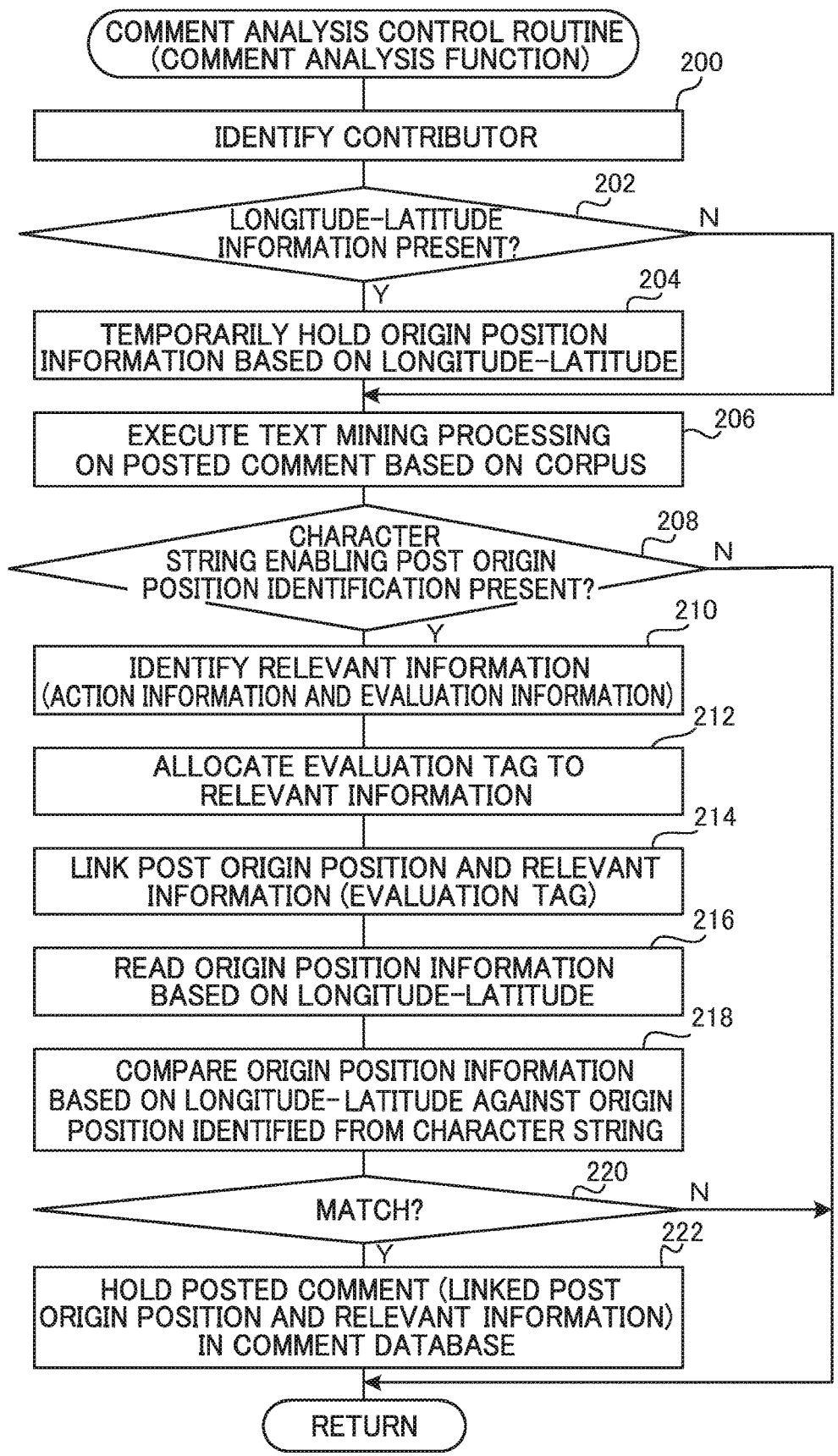

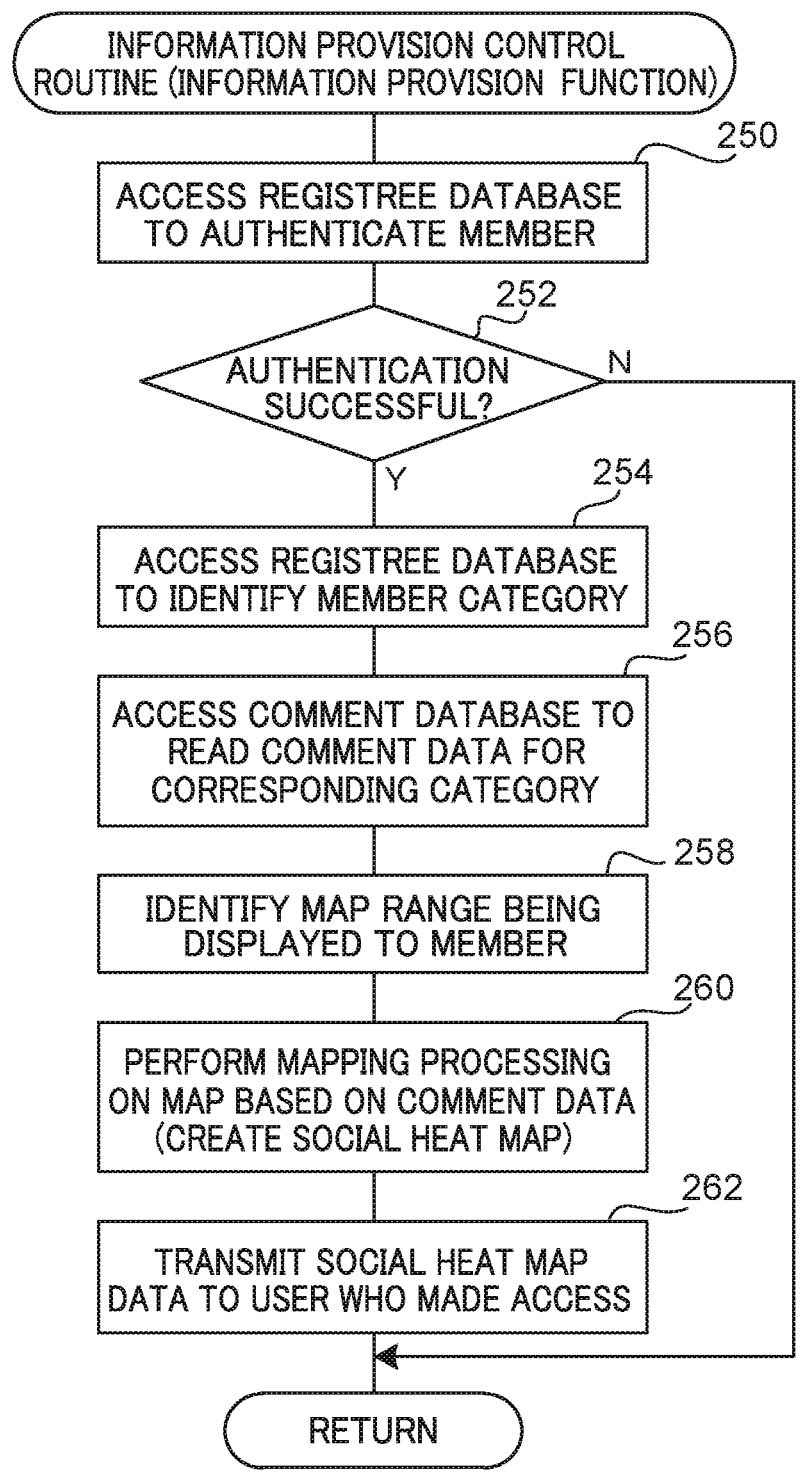

FIG.7

SURVEY INFORMATION STORAGE SECTION (CLARIFICATION OF STORED CONTENT)

| | |
|---|---|
| 1 | I WANT TO BE ENVIRONMENTALLY CONSCIOUS |
| 2 | I LIKE BEING CLOSE TO NATURE |
| 3 | I TAKE CARE OF MY HEALTH (EAT HEALTHILY AND EXERCISE REGULARLY) |
| 4 | I WANT TO TAKE PART IN LOCAL COMMUNITY AND/OR VOLUNTEER ACTIVITIES |
| 5 | I LET MY FAMILY AND FRIENDS KNOW ABOUT THINGS I LIKE AND OTHER INFORMATION |
| 6 | I'M ALERT TO TRENDS |
| 7 | I HAVE A WIDE-RANGING INTEREST IN WHAT'S GOING IN THE WORLD |
| 8 | I LIKE FINDING NEW PRODUCTS AND STORES |
| 9 | I DON'T MIND SPENDING MONEY AND TIME ON THINGS THAT INTEREST ME |
| 10 | I FOLLOW MY OWN PATH AND AM NOT EASILY SWAYED |
| 11 | I WANT TO IMPROVE MYSELF |
| 12 | I WANT TO BE ACKNOWLEDGED BY OTHERS |
| 13 | I RESPECT TRADITION AND MANNERS |
| 14 | I VALUE SPIRITUAL FULFILMENT OVER MATERIAL WEALTH |
| 15 | I WANT TO PRIORITIZE HOME LIFE OVER WORK |
| 16 | I CHOOSE ENVIRONMENTALLY FRIENDLY PRODUCTS, EVEN IF THEY'RE SLIGHTLY MORE EXPENSIVE |
| 17 | I WANT TO BUY PRODUCTS FROM ENVIRONMENTALLY AND SOCIALLY CONSCIOUS BUSINESSES AND STORES |
| 18 | I CHOOSE HEALTHY PRODUCTS, EVEN IF THEY'RE SLIGHTLY MORE EXPENSIVE |
| 19 | I FOCUS ON SAFETY WHEN BUYING PRODUCTS AND SERVICES |
| 20 | I CHOOSE DURABLE PRODUCTS, EVEN IF THEY'RE SLIGHTLY MORE EXPENSIVE |
| 21 | I CHOOSE KNOWN BRANDS OVER GENERIC GOODS, EVEN IF THEY'RE SLIGHTLY MORE EXPENSIVE |
| 22 | I GENERALLY LOOK AT THE PRICE AND CHOOSE THE CHEAPER OPTION |
| 23 | I OFTEN CHOOSE BY APPEARANCE WHEN BUYING PRODUCTS |
| 24 | I CHOOSE PRODUCTS WITH GOOD PERFORMANCE, EVEN IF THEY'RE SLIGHTLY MORE EXPENSIVE |
| 25 | I RESEARCH A PRODUCT BEFORE BUYING IT |
| 26 | I OFTEN CHOOSE A PRODUCT BECAUSE IT'S CONVENIENT TO BUY (CONVENIENCE IS A CONDITION FOR PURCHASE) |
| 27 | I ALWAYS BUY THE SAME BRAND |
| 28 | I CHOOSE POPULAR PRODUCTS |
| 29 | I REFER TO OTHER PEOPLE'S OPINIONS WHEN CHOOSING PRODUCTS |
| 30 | I CHOOSE THINGS THAT MOST OTHER PEOPLE DON'T HAVE |

\* Taken from *Survey and research on the segmentation of consumers based on lifestyle and environmental consciousness/assessment of value*, Norihisa Miyahara, Momoko Yamamura, Jiro Furuki, Journal of Mitsubishi Research Institute No. 51 (2009), pages 76 to 91.

FACTOR ANALYSIS BY PRINCIPAL FACTOR METHOD (FIRST STAGE)
CONVERT TO SCORE BASED ON RESPONSE RESULTS AFTER PERFORMING SURVEY

| STRONGLY DISAGREE | DISAGREE | NEITHER AGREE NOR DISAGREE | AGREE | STRONGLY AGREE |
|---|---|---|---|---|
| −2 | −1 | 0 | +1 | +2 |

FIG.10

FACTOR ANALYSIS BY PRINCIPAL FACTOR METHOD (SECOND STAGE)
EXCLUDE ITEMS WITH LOW LEVEL OF ULTIMATE COMMONALITY DURING PROCESS
OF FACTOR ANALYSIS AFTER PERFORMING SURVEY
(NOS. 13, 15, 25, AND 30 EXCLUDED AS AN EXAMPLE)

| No. | SET NAME | ITEM NAME |
|---|---|---|
| 1 | I WANT TO BE ENVIRONMENTALLY CONSCIOUS | ENVIRONMENTALLY CONSCIOUS |
| 2 | I LIKE BEING CLOSE TO NATURE | NATURE LOVER |
| 3 | I TAKE CARE OF MY HEALTH (EAT HEALTHILY AND EXERCISE REGULARLY) | HEALTH CONSCIOUS |
| 4 | I WANT TO TAKE PART IN LOCAL COMMUNITY AND/OR VOLUNTEER ACTIVITIES | LOCAL VOLUNTEER |
| 5 | I LET MY FAMILY AND FRIENDS KNOW ABOUT THINGS I LIKE AND OTHER INFORMATION | INFORMATION SHARER |
| 6 | I'M ALERT TO TRENDS | TREND FOLLOWER |
| 7 | I HAVE A WIDE-RANGING INTEREST IN WHAT'S GOING IN THE WORLD | BROAD RANGE OF INTERESTS |
| 8 | I LIKE FINDING NEW PRODUCTS AND STORES | LOVER OF NEW THINGS |
| 9 | I DON'T MIND SPENDING MONEY AND TIME ON THINGS THAT INTEREST ME | HOBBY FANATIC |
| 10 | I FOLLOW MY OWN PATH AND AM NOT EASILY SWAYED | SELF-BELIEVER |
| 11 | I WANT TO IMPROVE MYSELF | SELF-IMPROVER |
| 12 | I WANT TO BE ACKNOWLEDGED BY OTHERS | RECOGNITION SEEKER |
| 13 | I RESPECT TRADITION AND MANNERS | CONSERVATIVE |
| 14 | I VALUE SPIRITUAL FULFILMENT OVER MATERIAL WEALTH | UNMATERIALISTIC |
| 15 | I WANT TO PRIORITIZE HOME LIFE OVER WORK | AT-HOME TYPE |
| 16 | I CHOOSE ENVIRONMENTALLY FRIENDLY PRODUCTS, EVEN IF THEY'RE SLIGHTLY MORE EXPENSIVE | ECO CONSUMER |
| 17 | I WANT TO BUY PRODUCTS FROM ENVIRONMENTALLY AND SOCIALLY CONSCIOUS BUSINESSES AND STORES | SUPPORTER OF ECO BUSINESSES |
| 18 | I CHOOSE HEALTHY PRODUCTS, EVEN IF THEY'RE SLIGHTLY MORE EXPENSIVE | HEALTH CONSCIOUS CONSUMER |
| 19 | I FOCUS ON SAFETY WHEN BUYING PRODUCTS AND SERVICES | SAFETY FOCUSED |
| 20 | I CHOOSE DURABLE PRODUCTS, EVEN IF THEY'RE SLIGHTLY MORE EXPENSIVE | DURABILITY FOCUSED |
| 21 | I CHOOSE KNOWN BRANDS OVER GENERIC GOODS, EVEN IF THEY'RE SLIGHTLY MORE EXPENSIVE | BRAND DRIVEN |
| 22 | I GENERALLY LOOK AT THE PRICE AND CHOOSE THE CHEAPER OPTION | PRICE FOCUSED |
| 23 | I OFTEN CHOOSE BY APPEARANCE WHEN BUYING PRODUCTS | APPEARANCE DRIVEN |
| 24 | I CHOOSE PRODUCTS WITH GOOD PERFORMANCE, EVEN IF THEY'RE SLIGHTLY MORE EXPENSIVE | PERFORMANCE DRIVEN |
| 25 | I RESEARCH A PRODUCT BEFORE BUYING IT | INFORMATION ANALYST |
| 26 | I OFTEN CHOOSE A PRODUCT BECAUSE IT'S CONVENIENT TO BUY (CONVENIENCE IS A CONDITION FOR PURCHASE) | CONVENIENCE DRIVEN |
| 27 | I ALWAYS BUY THE SAME BRAND | REPEAT BUYER |
| 28 | I CHOOSE POPULAR PRODUCTS | POPULARITY DRIVEN |
| 29 | I REFER TO OTHER PEOPLE'S OPINIONS WHEN CHOOSING PRODUCTS | LIKES RECOMMENDED PRODUCTS |
| 30 | I CHOOSE THINGS THAT MOST OTHER PEOPLE DON'T HAVE | QUIRKY |

*Taken from *Survey and research on the segmentation of consumers based on lifestyle and environmental consciousness/assessment of value*, Norihisa Miyahara, Momoko Yamamura, Jiro Furuki, Journal of Mitsubishi Research Institute No. 51 (2009), pages 76 to 91.

FIG.11

FACTOR ANALYSIS BY PRINCIPAL FACTOR METHOD (THIRD STAGE)
IDENTIFY FACTOR TYPE OF SURVEY SUBJECT BASED ON FACTOR ANALYSIS
RESULT FOR EACH ITEM NAME (COMPUTE FACTOR LOADING)

| No. | Item name | first factor | second factor | third factor | fourth factor | fifth factor | sixth factor |
|---|---|---|---|---|---|---|---|
| 1 | ENVIRONMENTALLY CONSCIOUS | .713 | -.064 | -.015 | .040 | .032 | -.084 |
| 4 | LOCAL VOLUNTEER | .655 | -.168 | .014 | .108 | -.062 | .039 |
| 2 | NATURE LOVER | .626 | -.131 | -.087 | .031 | -.068 | .101 |
| 17 | SUPPORTER OF ECO BUSINESSES | .561 | .296 | .003 | -.003 | .089 | -.125 |
| 16 | ECO CONSUMER | .520 | .401 | -.013 | -.075 | .079 | -.080 |
| 14 | UNMATERIALISTIC | .501 | -.005 | -.0197 | -.022 | .030 | .175 |
| 3 | HEALTH CONSCIOUS | .483 | -.006 | .086 | .036 | -.067 | .070 |
| 20 | DURABILITY FOCUSED | .001 | .727 | .030 | -.050 | -.117 | .083 |
| 24 | PERFORMANCE DRIVEN | -.179 | .708 | .126 | -.048 | -.023 | .084 |
| 21 | BRAND DRIVEN | -.199 | .585 | -.070 | .296 | .050 | -.012 |
| 22 | PRICE FOCUSED | .095 | -.521 | .062 | -.048 | .354 | .025 |
| 18 | HEALTH CONSCIOUS CONSUMER | .332 | .512 | .063 | -.023 | .062 | -.062 |
| 19 | SAFETY FOCUSED | .247 | .512 | .060 | -.072 | .036 | -.027 |
| 6 | TREND FOLLOWER | -.111 | .029 | .802 | .003 | .060 | -.044 |
| 8 | LOVER OF NEW THINGS | -.083 | .050 | .711 | .032 | .000 | .030 |
| 7 | BROAD RANGE OF INTERESTS | .127 | .088 | .504 | -.072 | -.019 | .120 |
| 5 | INFORMATION SHARER | .174 | .006 | .415 | .242 | -.068 | .038 |
| 29 | LIKES RECOMMENDED PRODUCTS | .125 | .002 | .062 | .703 | -.112 | -.159 |
| 28 | POPULARITY DRIVEN | -.016 | .064 | -.021 | .567 | .267 | -.106 |
| 12 | RECOGNITION SEEKER | .081 | -0.94 | .185 | .371 | .015 | .140 |
| 23 | APPEARANCE DRIVEN | -.032 | -.212 | .278 | -.032 | .583 | -.061 |
| 26 | CONVENIENCE DRIVEN | .087 | -.123 | -.030 | -.027 | .570 | .074 |
| 27 | REPEAT BUYER | -.099 | .187 | -.294 | .103 | .427 | .203 |
| 10 | SELF-BELIEVER | .100 | .005 | .004 | -.201 | .083 | .650 |
| 11 | IMPROVER | .384 | -.042 | .073 | .083 | .005 | .528 |
| 9 | HOBBY FANATIC | -.204 | .269 | .212 | .031 | .012 | .439 |

\* Taken from *Survey and research on the segmentation of consumers based on lifestyle and environmental consciousness/assessment of value*, Norihisa Miyahara, Momoko Yamamura, Jiro Furuki, Journal of Mitsubishi Research Institute No. 51 (2009), pages 76 to 91.

FIG.12

FACTOR ANALYSIS BY PRINCIPAL FACTOR METHOD (FOURTH STAGE)
ALLOCATE NAME TO FACTOR TYPE AND NOTIFY SURVEY SUBJECT

| FACTOR TYPE | FACTOR NAME |
|---|---|
| FIRST FACTOR | BELIEVER IN HEALTHY AND SUSTAINABLE LIFESTYLE |
| SECOND FACTOR | SELECTIVE PERSON |
| THIRD FACTOR | MARKET WATCHER |
| FOURTH FACTOR | PASSIVE PERSON |
| FIFTH FACTOR | CONVENIENCE-FOCUSED PERSON |
| SIXTH FACTOR | SELF-BETTERING PERSON |

\* Taken from *Survey and research on the segmentation of consumers based on lifestyle and environmental consciousness/assessment of value*, Norihisa Miyahara, Momoko Yamamura, Jiro Furuki, Journal of Mitsubishi Research Institute No. 51 (2009), pages 76 to 91.

FIG.13A

CLASSIFICATION OF ACCUMULATED DATA, ALLOCATION OF EVALUATION TAGS
(CLASSIFYING AND ACCUMULATING COMMENTS THAT IDENTIFY POSITION AND INFORMATION RELATING TO THE POSITION FROM LARGE QUANTITY OF SNS-POSTED COMMENTS)

| POST DATE/TIME | POSTED CONTENT | EVALUATION TAG |
|---|---|---|
| Jan 15 2018 13:12 | ··· REALLY DELICIOUS··· DEPARTMENT STORE AT XXX STATION··· | A |
| Jan 15 2018 13:15 | ··· BAD REPUTATION··· IN MARUNOUCHI BRANCH OF FAMOUS XXX STORE | D |
| Jan 15 2018 14:15 | ··· WENT··· XXX BOOK STORE··· | C |
| Jan 15 2018 14:18 | ··· LUNCH··· SOUP··· YESTERDAY'S LEFTOVERS? VERY UNHAPPY··· | E |
| Jan 15 2018 14:20 | XXX FLAGSHIP STORE··· STYLISH··· | B |
| Jan 15 2018 14:22 | ···PREPARING SEATS IN BETWEEN RESERVATIONS ··· 2$^{ND}$ FLOOR LOUNGE OF XXX HOTEL | C |
| ... | ... | |
| Jan 15 2018 14:28 | ···STATION ON THE XXX LINE··· SWEET AT FIRST··· BECOMING SPICY··· WONDERFUL | A |
| Jan 15 2018 14:30 | ··· RESTAURANT NEAR XXX STATION··· LARGE GALBI RICE BOWL··· QUANTITY OVER QUALITY··· PRETTY DISGUSTING | E |
| Jan 15 2018 14:32 | ··· XXX TOWN··· OMG SO STYLISH··· WENT IN FOR FIRST TIME | A |
| ... | ... | |

FIG.13B

EVALUATION TAG ALLOCATION CRITERIA

| EVALUATION TAG | EVALUATION CRITERION |
|---|---|
| A | POSITIVE EVALUATION INCLUDING BOTH DESCRIPTOR AND MODIFIER, E.G. "REALLY DELICIOUS", "THE MOST BEAUTIFUL EVER" |
| B | POSITIVE EVALUATION INCLUDING DESCRIPTOR, E.G. "DELICIOUS", "BEAUTIFUL" |
| C | DOES NOT INCLUDE AN EVALUATION COMMENT, BUT REPORTS ON A SITUATION, E.G. "WENT", "BOUGHT" |
| D | NEGATIVE EVALUATION INCLUDING DESCRIPTOR, E.G. "DISGUSTING", "DIRTY" |
| E | NEGATIVE EVALUATION INCLUDING BOTH DESCRIPTOR AND MODIFIER, E.G. "ABSOLUTELY DISGUSTING", "REALLY DIRTY" |

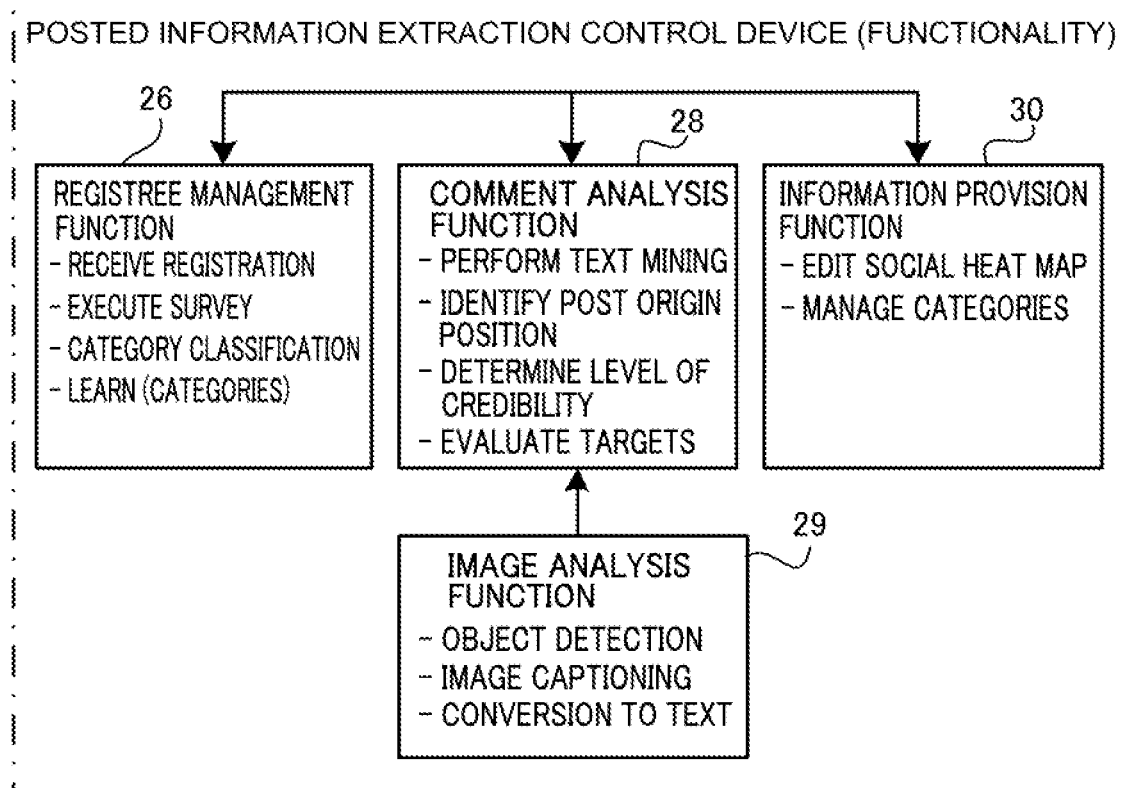

FIG.18A
SOURCE IMAGE (POSTED INFORMATION)
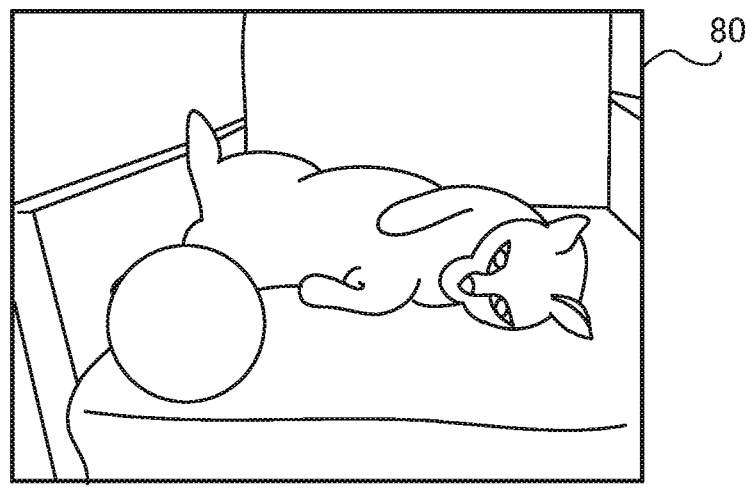
FIG.18B
OBJECT DETECTION AND CAPTIONING
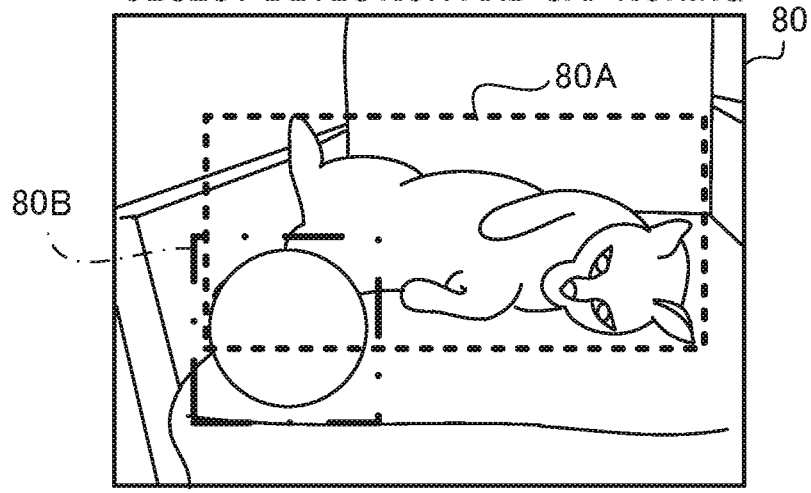
FIG.18C
TEXT GENERATION
A cat is laying on the chair with a ball.

POSTED INFORMATION EXTRACTION CONTROL DEVICE AND COMPUTER READABLE STORAGE MEDIUM

TECHNICAL FIELD

The present disclosure relates to a posted information extraction control device and a posted information extraction control program for extracting given posted information from out of posted information (hereafter also referred to as comments) posted on a social networking service (SNS).

BACKGROUND ART

Analysis of comments posted on a SNS (such as customer review analysis, SNS account analysis, posting management, attribute analysis, click count analysis, diffusion analysis, and competitive analysis) is now commonly performed.

Japanese Patent Application Laid-Open (JP-A) No. 2014-142738 describes extensively exploiting a large quantity of information posted on a SNS, and exploiting posted information that has been made more user-friendly in order to provide a more user-friendly service.

JP-A No. 2014-142738 includes a first group based on first posted information and a second group based on second posted information. A phrase extracted from the first posted information and a phrase extracted from the second posted information are compared. Based on the result of this comparison, a first keyword unique to the first posted information and a second keyword unique to the second posted information are identified. The first keyword is managed in association with the first group, and the second keyword is managed in association with the second group.

International Publication (WO) No. 2015/052785 describes a system in which an information extraction server for extracting information relating to infrastructure, a past incident DB, a space-time information DB, and a manager terminal are capable of communicating with each other. This system is capable of communicating with a client terminal for displaying information extracted by the information extraction server, and map information is employed by the client server to display received infrastructure status information using a predetermined icon at a predetermined position on a map.

SUMMARY OF INVENTION

Technical Problem

However, hitherto the utilization of comments has been limited to ascertaining trends in comments to be exploited for marketing purposes and the like. It has therefore not been possible to evaluate the quality of comments, for example of the consistency of comment origin position information.

Hitherto, all comments posted on a SNS have been processed. These comments therefore included many in which the topic of the comment and an area (location) identified with this topic are not linked together, making evaluation of the identified area (for example a region or space designated for what is referred to as community development) impossible. Moreover, no standard has been established for evaluating such identified areas.

The present disclosure obtains a posted information extraction control device and a posted information extraction control program capable of acquiring information that is of value to a user by extracting posted information concerning a predetermined theme and having a high level of credibility from out of a large unspecified cluster of posted information posted on a SNS.

Solution to Problem

A posted information extraction control device of the present disclosure includes a selection means and an extraction means. The selection means is configured to perform natural language analysis on a large unspecified cluster of posted information including characters and that has been submitted over a network, in order to select from out of the large unspecified cluster of posted information first posted information that includes character string information indicating a position. The extraction means is configured to certify the first posted information selected by the selection means as being submitted from within a given area based on the character string information, and to extract second posted information including relevant information relating to a target present within the given area.

In the present disclosure, information with a high level of credibility is extracted from the large unspecified cluster of posted information including characters and submitted over the network.

Namely, the selection means performs natural language analysis on the large unspecified cluster of posted information. The first posted information that includes character string information identifying a position is thus selected from the large unspecified cluster of posted information.

The extraction means extracts the second posted information from the first posted information selected by the selection means based on the character string information included in the first posted information. The second posted information is information that was submitted from within the given area, and that includes relevant information relating to the target present within the given area.

The extracted second posted information is posted information that was submitted from within the given area and includes the relevant information relating to the target present within the given area, and may thus be considered to be posted information with a high level of credibility out of the large unspecified cluster of posted information.

In the present disclosure, in cases in which longitude-latitude information for a submission origin is included in the second posted information extracted by the extraction means, the longitude-latitude information is compared against the character string information indicating a position within the given area in order to determine credibility of the position indicated by the character string information.

The large unspecified cluster of posted information submitted over the network may include longitude-latitude information for submission origins. For example, if a communication terminal is provided with global positioning system (GPS) functionality and this GPS functionality is in an operational state, such position information (longitude-latitude information) for the submission origin of the posted information may be automatically embedded.

In cases in which the second posted information extracted by the extraction means includes longitude-latitude information for the submission origin, this longitude-latitude information is compared against the character string information indicating a position within the given area to determine the credibility of the position indicated by the character string information.

The position of the second posted information can thus be considered to have a higher level of credibility than in cases in which the determination of the position is based solely on the character string information.

In the present disclosure, the extraction means is configured to split the first posted information into individual word units, and to certify the first posted information as being submitted from within the given area based on respective parts of speech of the individual words.

Whether the submitter of the posted information submitted the posted information from within the given area (for example when parts of speech such as verbs in the present continuous tense are employed), or whether the submitter of the posted information submitted the posted information after already having moved out of the given area (when parts of speech such as verbs in the past tense are employed), can be determined based on the parts of speech of the individually split words.

In the present disclosure, the relevant information includes action information indicating an action with respect to the target and evaluation information indicating an opinion about the target, and a graded evaluation is set based on a sensory expression in the character string information in the second posted information for at least the evaluation information.

In particular, for example, in cases in which the action information with respect to the target is the information "went to such-and-such a place", the frequency with which this action information of "went to such-and-such a place" appears can be used as grounds for determining whether or not there is an interest in performing this action.

Moreover, regarding the evaluation information with respect to the target, for example if the target is a food item, applying graded evaluations such as "really delicious", "delicious", "not bad", "disgusting", "really disgusting" can be used as grounds for determining whether or not there is a desire to eat this target.

The present disclosure further includes a notification means configured to provide notification of guidance information including a density level of the relevant information with respect to the target.

The notification means notifies the guidance information including a density level of the relevant information with respect to the target, thereby user-friendliness for the user.

The present disclosure further includes a sorting means configured to link the target with the relevant information relating to the target and sort into plural predetermined categories, and a classification means configured to request a user who uses the guidance information notified using the notification means to respond to a predetermined statement when the user registers, and to analyze the response and classify the user by plural categories. Moreover, the notification means is configured to provide notification with other guidance information corresponding to a category into which the member was placed in the classification.

The sorting means links the target with the relevant information relating to the target and sorts into the plural predetermined categories.

The classification means requests the user who uses the guidance information notified using the notification means to respond to the predetermined statement when the user registers, and performs factor analysis on the response in order to classify the member based on the plural categories.

The notification means is thus capable of notifying of guidance information corresponding to the category into which the user was placed in the classification. Since the categories classify the user according to lifestyle and personality, the notified guidance information is tailored to the user, and can thus be more valuable information than in cases in which notification is made without performing category classification.

In the present disclosure, in cases in which the large unspecified cluster of posted information includes an image, image analysis is performed including at least one out of object detection or image captioning in order to generate character string information describing the image.

The posted information may be text-only, image-only, or a combination of both text and images. In the latter cases, image analysis is performed to generate character string information describing the image to allow handling in a manner similar to that of text.

A posted information extraction control program according to the present disclosure is configured to cause a computer to operate as a posted information extraction control device.

Advantageous Effects of Invention

The present disclosure configured as described above is capable of acquiring information that is of value to a user by extracting posted information concerning a predetermined theme and having a high level of credibility from out of a large unspecified cluster of posted information posted on a SNS.

BRIEF DESCRIPTION OF DRAWINGS

FIG. 2 is a functional block diagram illustrating functionality executed by respective sections of a posted information extraction control device according to an exemplary embodiment in block form, as arranged by control content.

FIG. 3 is a control flowchart illustrating a main routine of a posted information extraction control device according to an exemplary embodiment.

FIG. 4 is a flowchart illustrating a registree management control routine executed by a registree management function of a posted information extraction control device according to an exemplary embodiment.

FIG. 5 is a flowchart illustrating a comment analysis control routine executed by a comment analysis function of a posted information extraction control device according to an exemplary embodiment.

FIG. 6 is a flowchart illustrating an information provision control routine executed by an information provision function of a posted information extraction control device according to an exemplary embodiment.

FIG. 7 is a front view illustrating clarified survey information content stored in a survey information storage section.

FIG. 8B is a front view illustrating survey item screens sequentially displayed on a mobile terminal in the possession of a user.

FIG. 9 is a table illustrating content of survey responses to be selected by a user in a first stage of factor analysis according to a first example of an exemplary embodiment.

FIG. 10 is a table illustrating content from which items with a low level of ultimate commonality have been excluded in a second stage of factor analysis according to the first example of an exemplary embodiment.

FIG. 11 is a table illustrating a computation result of factor loading for respective factor types in a third stage of factor analysis according to the first example of an exemplary embodiment.

FIG. 12 is a correspondence table between factor types notified to survey subjects and names of the factor types in a fourth stage of image analysis according to the first example of an exemplary embodiment.

FIG. 13A is a table illustrating a list of comments in which origin position information and relevant information (evaluation information and action information) are present in a character string, the comments having been extracted from a large quantity of SNS comments by text mining processing according to a second example of an exemplary embodiment.

FIG. 13B is a table illustrating evaluation criteria for evaluation tags allocated to the extracted comments in FIG. 13A.

FIG. 15 is a block diagram to explain functionality of a posted information extraction control device according to a modified example of an exemplary embodiment.

FIG. 18A is a front view of an image, illustrating an example of image captioning performed during image analysis.

FIG. 18B is a front view illustrating a state in which distinctive images have been extracted from a source image.

FIG. 18C is a front view illustrating image analysis text generated based on extracted distinctive images.

DESCRIPTION OF EMBODIMENTS

Figure 1A:
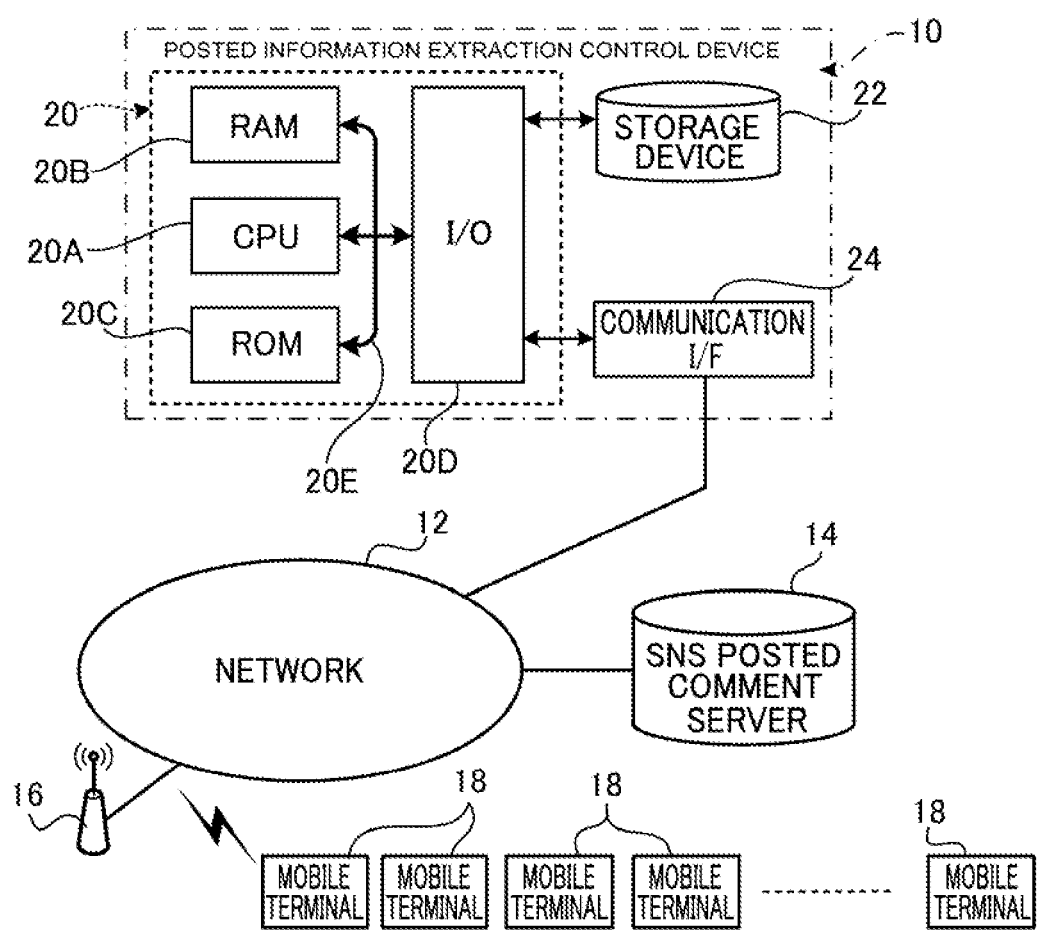
FIG. 1A is a schematic view illustrating an overall system principally configured by a posted information extraction control device of an exemplary embodiment.

FIG. 1A is a schematic view of a network system principally configured by a posted information extraction control device 10 according to an exemplary embodiment. Note that the posted information of the present disclosure refers to comments (either text information or image information) posted on a SNS. Thus, posted information and comments are taken to have the same meaning.

An SNS posted comment server 14 is connected to a network 12 (such as the internet). Comments posted using plural mobile terminals 18 (such as smartphones) are accumulated in the SNS posted comment server 14 via a wireless communication device 16. Note that although comments posted using PCs and the like that are wirelessly connected to the network 12 independently of the wireless communication device 16 are not excluded, the present exemplary embodiment concerns comments relating to a predetermined theme that are submitted from a given area (location) when visiting this given area, and so explanation primarily focuses on submissions from the mobile terminals 18.

The posted information extraction control device 10 is connected to the network 12.

The posted information extraction control device 10 includes a microcomputer 20. The microcomputer 20 includes a CPU 20A, RAM 20B, ROM 20C, an input/output port (I/O) 20D, and a bus 20E such as a data bus or a control bus that connects these elements together.

A storage device 22 and a communication I/F 24 are connected to the I/O 20D.

The storage device 22 is flash memory or the like, typically in the form of a hard disc, USB memory, or SD memory, and may also be utilized as a supplementary storage space of the RAM 20B and the ROM 20C. In the posted information extraction control device 10, a comment extraction control program or the like is pre-stored in a recording region of the RAM 20B, the ROM 20C, or the storage device 22, and this program is read when appropriate to the processing situation of the CPU 20A.

Figure 1B:
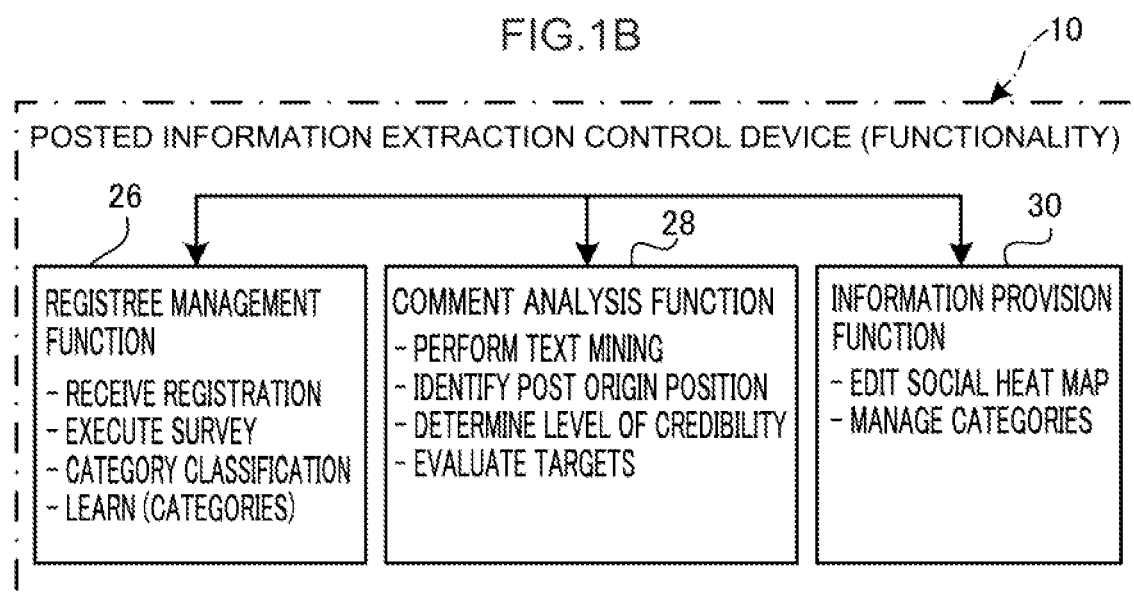
FIG. 1B is a block diagram to explain functionality of a posted information extraction control device according to an exemplary embodiment.

FIG. 1B is a block diagram illustrating operation performed when the comment extraction control program is executed by the posted information extraction control device 10, with operation being classified according to functionality.

Namely, the posted information extraction control device 10 operates as a registree management function 26, a comment analysis function 28, and an information provision function 30.

The registree management function 26 principally includes receiving member (user) registration, carrying out a survey (see FIG. 7, FIG. 8, and FIG. 9) performed on registration, classifying registered users into categories (see FIG. 10, FIG. 11, and FIG. 12), and learning the classified categories.

The comment analysis function 28 principally includes text mining comments acquired from the SNS posted comment server 14, determining a post origin position, identified by the text mining, and the level of credibility thereof, and evaluating targets relating to the theme (see FIG. 13). The targets include restaurants, shops, scenic spots, tourist spots, and the like. The target evaluation refers to a description of the user's feelings, such as "delicious", "disgusting", "expensive", "cheap", "beautiful", or "dirty" (collectively referred to as sensory expressions). Note that action information relating to the target, such as "went" or "saw", may also be included, and that this evaluation information and action information is collectively referred to as relevant information.

The information provision function 30 includes generating and editing social heat maps (see FIG. 14) provided to users based on the results of comment analysis, as well as managing user categories and so on. A social heat map refers to a map that is superimposed on a normally displayed map image, in which regions are displayed with different intensity or color in order to emphasize locations with a large quantity of information applicable to a user's category.

Detailed Description of Posted Information Extraction Control Device 10

FIG. 2 is a functional block diagram illustrating respective processing performed when the registree management function 26, the comment analysis function 28, and the information provision function 30 are executed by the posted information extraction control device 10 in block form, arranged by functionality. Note that the respective blocks aim to clarify the respective processing, and so are not limited to hardware configuration of the posted information extraction control device 10. Thus, some or all of the processing may be executed by what is referred to as software processing based on the comment extraction control program.

Registree Management Function 26

As illustrated in FIG. 2, a registration processing section 32 is connected to the network 12. The registration processing section 32 receives new registration and survey response information from mobile terminals 18 in the possession of users.

The registration processing section 32 is connected to a transmission section 34 and a survey analysis section 36.

Note that in cases in which the information received by the registration processing section 32 relates to a new registration, the transmission section 34 is instructed to transmit survey information.

A survey information storage section 38 is connected to the transmission section 34. As illustrated in the example in FIG. 7, survey information is stored in the survey information storage section 38.

On receiving the instruction from the registration processing section 32, the transmission section 34 reads the survey information from the survey information storage section 38 and transmits this information to the mobile terminal 18 of the user who wishes to register. Note that when transmitting the survey information, the transmission section 34 also requests that the user respond to the survey and requests that the user submit an initial posted comment.

The survey is required in order to classify the user into a category (corresponding to the name of a factor as classified by factor analysis, as illustrated in the example in FIG. 12) on registration of the user.

The initial posted comment is required at least in order to increase the number of comments by the user in which a current position and an evaluation of a target at their current position are linked together. Another potential aim is to make the user aware that comments in which a current position and an evaluation are linked together are required.

In cases in which the information received by the registration processing section 32 is survey response information, the survey analysis section 36 is instructed to perform survey analysis. The survey analysis section 36 is connected to a registree category classification section 40.

The registree category classification section 40 uses the transmission section 34 to notify the user who has requested registration of their classification category (factor type), associates the registration information of the registree with the classified factor type, and registers this in a registree database 42.

The registree database 42 is connected to an AI learning processing section 44. The AI learning processing section 44 monitors changes in the preferences of registrees based on the level of credibility of comments and the contributors who post the comments on the SNS, described later, and edits (changes, adds to, deletes, or the like) the categories (factor types) of the respective registrees registered in the registree database 42.

Comment Analysis Function 28

As illustrated in FIG. 2, the comment analysis function 28 is provided with a posted comment acquisition section 46 that acquires SNS posts posted on the network 12 on a random basis. Namely, the position of submission, level of credibility, and so on of comments are not taken into consideration when these comments are acquired.

The posted comment acquisition section 46 is connected to a contributor identification section 48, a text mining processing section 50, and a longitude-latitude information extraction section 52.

The contributor identification section 48 identifies the contributor based on the address from which the comment was submitted and so on. The identified contributor information is sent to the AI learning processing section 44 of the registree management function 26 in order to compare the contributor against registered users.

The text mining processing section 50 performs machine learning to split writing in a posted comment (i.e. written data) into individual words (such as nouns, verbs, and adjectives) in order to pick out exploitable information. A corpus 51 containing a large collection of natural language may be utilized as learning data when performing the machine learning.

The text mining processing section 50 is connected to a post origin position identification section 54 and a relevant information identification section 56.

The post origin position identification section 54 analyzes character strings rendered during the text mining processing for a character string identifying the post origin position. In cases in which a character string identifying the post origin position is present, this is sent to a linking section 58. In other words, comments in which a post origin position is not identified are eliminated at this point.

The relevant information identification section 56 identifies relevant information (namely action-related information and evaluation-related information) from the character string rendered during the text mining processing. The relevant information thus identified is sent to a relevant information evaluation section 60, which allocates the relevant information with an evaluation score. As illustrated in the example in FIG. 13B, the relevant information is allocated one out of five set graded evaluation tags (scores) (A, B, C, D, and E).

After being allocated an evaluation tag, the relevant information is sent to the linking section 58 where it is linked with the post origin position information sent from the post origin position identification section 54 (extracted comment).

This extracted comment is sent to a credibility determination section 62.

Note that the longitude-latitude information extracted by the longitude-latitude information extraction section 52 is information that can be acquired when a GPS function of the mobile terminal 18 in the possession of the user has been started up. The position of the mobile terminal 18 (namely, the current position of the user) can be accurately identified using this longitude-latitude information.

Having extracted the longitude-latitude information, the longitude-latitude information extraction section 52 sends this longitude-latitude information to the credibility determination section 62.

On receiving the longitude-latitude information from the longitude-latitude information extraction section 52, the credibility determination section 62 compares this information against the post origin position information in the character string in the extracted comment. The level of credibility of the extracted comment is thereby determined, and extracted comments with a high level of credibility are held in a comment database 64.

In cases in which longitude-latitude information is not received from the longitude-latitude information extraction section 52, the extracted comment received from the linking section 58 is held in the comment database 64 without making such a comparison.

Note that the determination result of the credibility determination section 62 is sent to the contributor of the extracted comment, and to the AI learning processing section 44 of the registree management function 26. In cases in which the contributor is a registered user, the posting frequency and level of credibility of this user are associated and learnt, and a determination is made as to whether or not there is a need to edit the category (factor type) of this registered user.

Information Provision Function 30

An aim of the information provision function 30 is to provide a user (registree) with a social heat map generated based on extracted comments.

As illustrated in FIG. 2, an authentication section 66, a displayed map information procurement section 68, and a social heat map data transmission section 70 are connected to the network 12.

When the user operates their mobile terminal 18 to request a social heat map, this request is received by the authentication section 66. The authentication section 66 searches the registree database 42 based on discrimination information and so on contained in the request item to authenticate whether or not the user is registered.

The authentication section 66 is connected to a category identification section 72 and the displayed map information procurement section 68.

The category identification section 72 accesses the registree database 42 to identify the category of the user (registree) who has requested the social heat map, and sends this to a comment data reading section 74.

The displayed map information procurement section 68 also accesses the mobile terminal 18 in the possession of the user, procures map information that is currently being displayed, and sends this to the comment data reading section 74.

The comment data reading section 74 reads comment data having origin position information from within the range of the map procured from the mobile terminal 18 of the user from the comment database 64, and sends this to a mapping processing section 76.

The mapping processing section 76 maps a heat map corresponding to the comment data onto the procured map, and uses the social heat map data transmission section 70 to send this to the mobile terminal 18 in the possession of the user. Thus, a social heat map is displayed on a monitor 18M of the mobile terminal 18 as illustrated in FIG. 14B.

Explanation follows regarding operation of the present exemplary embodiment, with reference to the flowcharts in FIG. 3 to FIG. 6.

FIG. 3 is a control flowchart illustrating a main routine of the posted information extraction control device 10 according to the present exemplary embodiment.

At step 100, determination is made as to whether or not information has been received. In cases in which determination is negative, the present routine is ended.

In cases in which determination is affirmative at step 100, processing transitions to step 102. The received information is categorized, and processing transitions to step 104.

At step 104, the processing branches according to the type of information received. Namely, in cases in which the type of information received at step 104 is determined to be registration-related, processing transitions to step 106, and registree management control (illustrated in detail in FIG. 4) is executed before ending the present routine.

In cases in which the type of information received at step 104 is determined to be a posted comment, processing transitions to step 108, and comment analysis control (illustrated in detail in FIG. 5) is executed before ending the present routine.

In cases in which the type of information received at step 104 is determined to be a social heat map request, processing transitions to step 110, and information provision control (illustrated in detail in FIG. 6) is executed before ending the present routine.

Registree Management Control

FIG. 4 is a flowchart illustrating a registree management control subroutine performed at step 106 in FIG. 3.

At step 150, the type of information received is discerned. In cases in which the type of information received is discerned at step 150 to be a new registration, processing transitions to step 152 and the survey information is read from the survey information storage section 38. Processing then transitions to step 154.

At step 154, the survey information and a response request is transmitted to the mobile terminal 18 in the possession of the user. Next, at step 156, the user is requested to post an initial comment, and processing transitions to step 164. Note that an initial posting is not essential.

In cases in which the type of information received is discerned to be survey response information at step 150, processing transitions to step 158 and the survey response is analyzed (for example by factor analysis).

Next, at step 160, the registree is classified into a category (see FIG. 12), after which processing transitions to step 162. This category is associated with categorization information for the registree and held in the registree database, after which processing transitions to step 164.

At step 164, determination is made as to whether or not a post has been received from the registree. In cases in which determination is affirmative, processing transitions to step 166, the category of the registree is learnt based on relevant information posted by the registree, and processing returns to the main routine. In cases in which determination is negative at step 164, processing also returns to the main routine.

Comment Analysis Control

FIG. 5 is a flowchart illustrating a comment analysis control subroutine performed at step 108 in FIG. 3.

At step 200, the contributor is identified, and processing transitions to step 202, at which determination is made as to whether or not longitude-latitude information is included in the posted comment. In cases in which longitude-latitude information is determined to be included at step 202, processing transitions to step 204. Origin position information based on the longitude and latitude is temporarily held, and processing transitions to step 206. In cases in which longitude-latitude information is determined not to be included at step 202, processing transitions to step 206.

At step 206, text mining processing is executed on the posted comment based on the language stored in the corpus 51. Namely, machine learning is performed to split the writing in the posted comment (i.e. written data) into individual words (such as nouns, verbs, and adjectives) in order to pick out exploitable information. The corpus 51 containing a large collection of natural language is utilized as learning data when performing the machine learning.

Next, at step 208, determination is made as to whether or not there is a character string enabling the post origin position to be identified in the character strings obtained during the text mining processing.

In cases in which determination is negative at step 208, determination is made that this comment is to be excluded (the comment is not worth using), and processing returns to the main routine.

In cases in which determination is affirmative at step 208, determination is made that the comment is worth using. Processing transitions to step 210, and the relevant information is identified. The relevant information is a collective term for evaluation information (terms such as "delicious" or "beautiful") and action information (terms such as "went" or "ate").

Next, at step 212, an evaluation tag is allocated to the identified relevant information (see the five types of evaluation tag in the example illustrated in FIG. 13B). Processing then transitions to step 214, at which the post origin position and the relevant information (evaluation tag) are linked together.

Next, at step 216, the temporarily held origin position information based on the longitude and latitude is read. Processing then transitions to step 218, at which the origin position information based on the longitude-latitude information is compared against the origin position as identified from the character string. Processing then transitions to step 220.

At step 220, determination is made as to whether or not the comparison result is a match. In cases in which determination is affirmative at step 220, processing transitions to step 222, and the posted comment (i.e. the linked post origin position and relevant information) is held in the comment database 64. Processing then returns to the main routine. In cases in which determination is negative at step 220, determination is made that this comment is to be excluded (i.e. the comment is not worth using), and processing returns to the main routine.

Note that configuration may be made such that comments that do not include longitude-latitude information are all held in the comment database 64, or selection/rejection may be performed by another method (for example in cases in which the origin position information in the character string is an address or the like, and can be determined to be unique).

Information Provision Control

FIG. 6 is a flowchart illustrating an information provision control subroutine performed at step 110 in FIG. 3.

At step 250, the registree database 42 is accessed, the member (registered user) is authenticated, and processing transitions to step 252.

At step 252, determination is made as to whether or not authentication has been successful. In cases in which determination is negative, processing returns to the main routine. Note that the authentication processing may be attempted a preset number of times.

In cases in which determination is affirmative at step 252, processing transitions to step 254, at which the registree database 42 is accessed, and the category of the member (registered user) is identified. Processing then transitions to step 256.

At step 256, the comment database 64 is accessed, and comment data is read for the corresponding category. Next, processing transitions to step 258, a map range being displayed for the member (registered user) is identified, and processing transitions to step 260.

At step 260, mapping processing is executed on the map based on the comment data to create a social heat map, and processing transitions to step 262.

At step 262, the social heat map data is transmitted to the member (registered user) who made access, and processing returns to the main routine.

EXAMPLES

Explanation follows regarding examples of the main processing executed by the respective functionality of the posted information extraction control device 10 (i.e. the registree management function 26, the comment analysis function 28, and the information provision function 30).

First Example

A first example is an example of a flow of processing by the registree management function 26, from a survey response request to factor analysis.

When a user requests registration, survey information is transmitted from the transmission section 34 in FIG. 2.

Figure 8A:
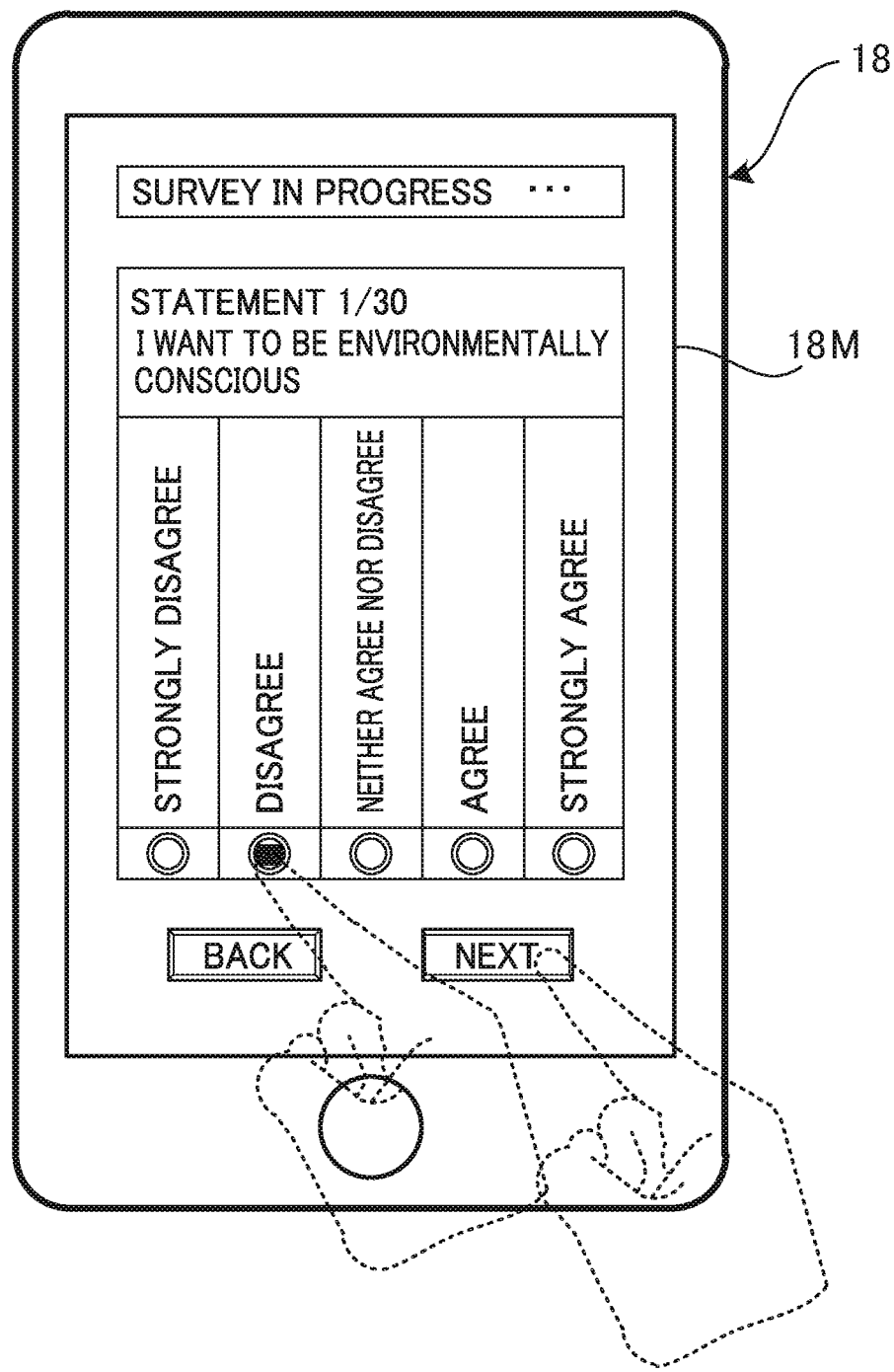
FIG. 8A is a front view illustrating a mobile terminal in the possession of a user.
Figure 8B:
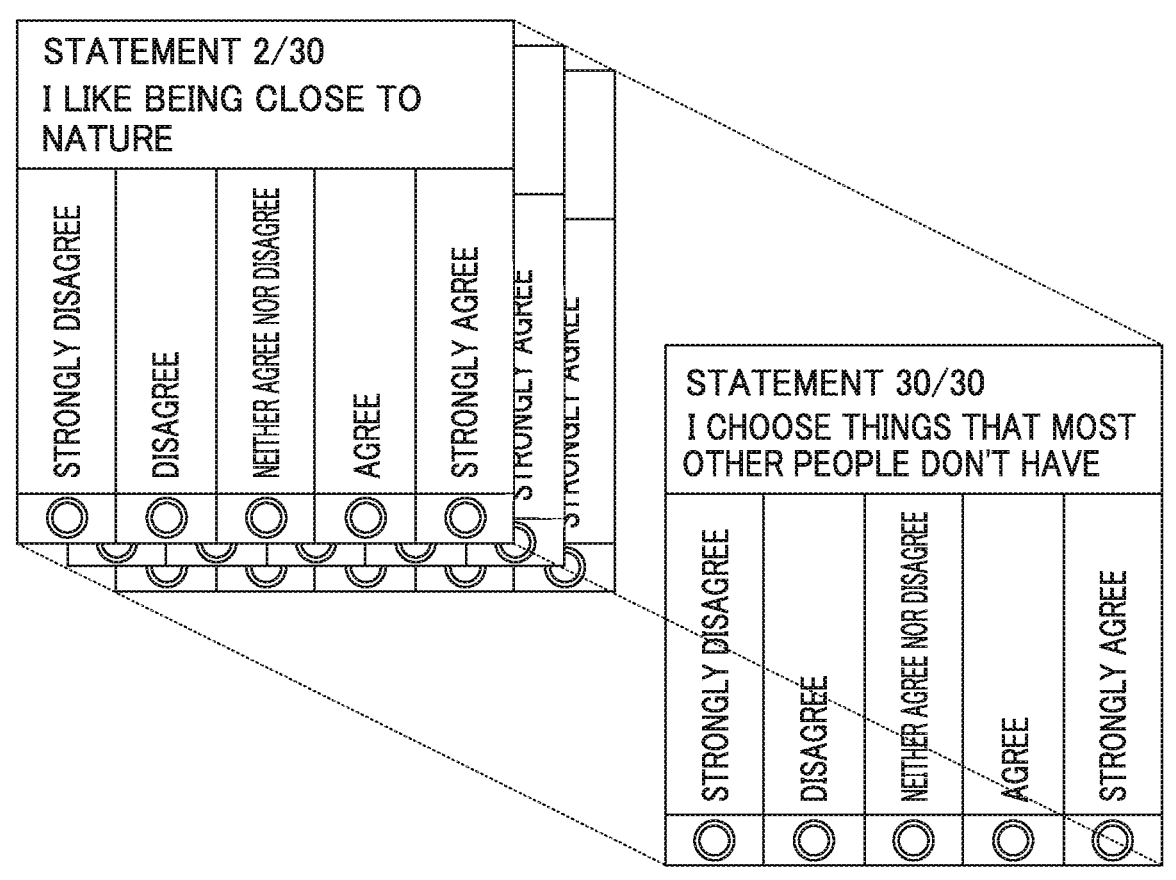

As illustrated in FIG. 8A, thirty survey statements (see FIG. 7) are sequentially displayed on the monitor 18M of the mobile terminal 18 in the possession of the user.

The survey is performed by making a selection from out of five responses. The five response options to each statement are "strongly disagree", "disagree", "neither agree nor disagree", "agree", and "strongly agree". The user makes a selection (by touch operation) based on their own judgement. Note that when the user touch-operates the "NEXT" button, the statement is changed (see FIG. 8B), and the user repeats the response selection for the next statement.

When the user has finished responding to the survey and transmits the survey response information, the survey analysis section 36 and the registree category classification section 40 in FIG. 2 execute factor analysis processing.

As illustrated in FIG. 9, a score is allocated to each of the survey response options. In this example, "strongly disagree" is set to −2 points, "disagree" is set to −1 point, "neither agree nor disagree" is set to 0 points, "agree" is set to +1 point, and "strongly agree" is set to +2 points, and these points are accumulated (a first stage of factor analysis). An item name is set in advance for each statement (see FIG. 10). These item names are an important element in classifying the factor type.

As illustrated in FIG. 10, in a second stage of the factor analysis, any statements with a low level of ultimate commonality are excluded from the survey responses during the factor analysis process. In this example, statement numbers 13, 15, 25, and 30 have been excluded.

FIG. 11 illustrates factor analysis results for each set item name. In this example, factor loading has been computed for each of six factor types. These results are used to identify the factor type of the survey subject (a third stage). This identification is for example executed by performing comparisons against preset average values.

As illustrated in FIG. 12, names are allocated to each of the six factor types.

For example, the first factor type corresponds to a believer in a healthy and sustainable lifestyle, the second factor type corresponds to a selective person, the third factor type corresponds to a market watcher, the fourth factor is a passive person, the fifth factor type corresponds to a convenience-focused person, and the sixth factor is a self-bettering person. Each factor type is preferably allocated a name that instantly brings to mind the category to which it refers. Note that there is no limitation to six factor types. Moreover, there is no particular limitation to the names of the factor types, as long as each name makes the nature of the corresponding factor immediately apparent.

The registree category classification section 40 uses the transmission section 34 to notify the survey subject of the name of their factor type. Note that the notified factor type is not necessarily a single type, and a notification such as "You have been classified into two categories: a believer in a healthy and sustainable lifestyle and a passive person" may be performed.

In the first example, factor analysis of the survey responses is performed using a principal factor method. However, other analysis methods may be employed as along as category classification can be performed.

Second Example

A second example is an example illustrating a flow of text mining processing by the comment analysis function 28.

FIG. 13A illustrates a result of subjecting a large quantity of SNS-posted comments acquired by the posted comment acquisition section 46 to text mining processing in order to extract comments (i.e. extracted comments) with character strings including both origin position information and relevant information (evaluation information and action information).

For example, the posted content in the first row in FIG. 13A is a comment including "really delicious . . . department store at XXX station", which includes the evaluation information "really delicious" and the origin position information "department store at XXX station".

FIG. 13B illustrates criteria employed when allocating evaluation tags to evaluation information in character strings from extracted comments.

There are five grades of evaluation tag, these being A, B, C, D, and E.

The evaluation tag A is allocated to extracted comments that include both a descriptor and a modifier, such as "really delicious" or "the most beautiful ever", and that correspond to a positive evaluation. The extracted comment in the first row has the evaluation tag A.

The evaluation tag B is allocated to extracted comments that include a descriptor, such as "delicious" or "beautiful", and that correspond to a positive evaluation.

The evaluation tag C is allocated to extracted comments that are not evaluation comments, but do include action information that reports on a situation, such as "went" or "bought".

The evaluation tag D is allocated to extracted comments that include a descriptor, such as "disgusting" or "dirty", and that correspond to a negative evaluation.

The evaluation tag E is allocated to extracted comments that include both a descriptor and a modifier, such as "absolutely disgusting" or "really dirty", and that correspond to a negative evaluation.

The evaluation tags may be based on numbers (points) instead of letters.

An evaluation tag is allocated to each of the extracted comments in FIG. 13A based on the evaluation criteria in FIG. 13B, and the extracted comments are held in the comment database 64 in this evaluation tag-allocated state. Note that the longitude-latitude information is what is referred to as stealth data, and so the presence or absence of longitude-latitude information is not recorded in FIG. 13A. However, in cases in which longitude-latitude information is present, this information may be compared against origin position information identified in the text mining processing so as to determine whether or not to hold this information in the comment database 64.

Third Example

A third example is an example illustrating a display format of a social heat map by the information provision function 30.

Figure 14A:
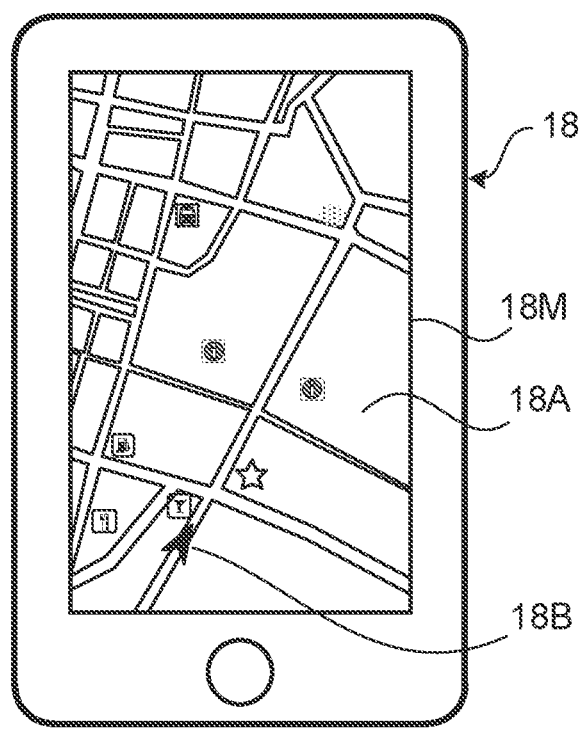
FIG. 14A is a front view illustrating a map image displayed on a monitor of a mobile terminal in the possession of a user, according to a third example of an exemplary embodiment.
Figure 14B:
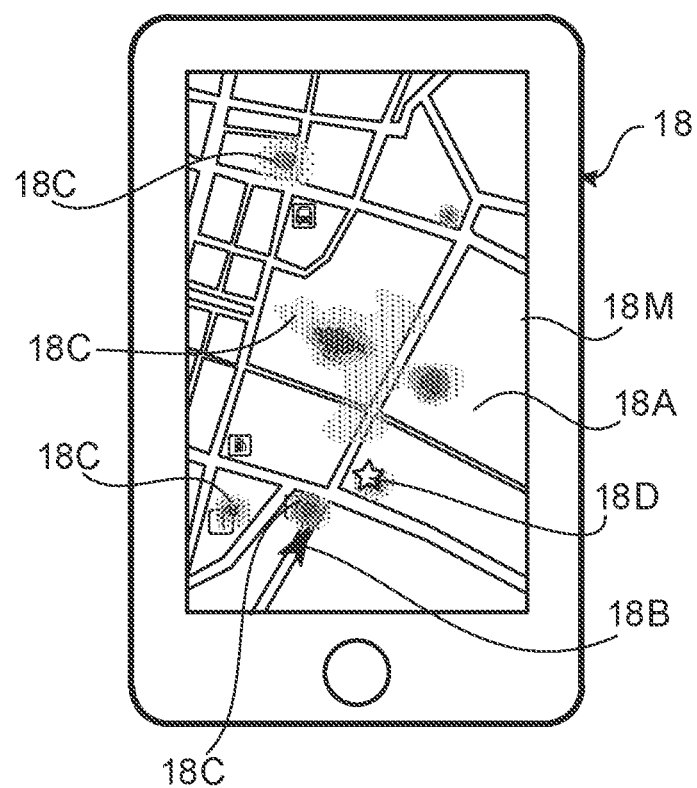
FIG. 14B is a front view illustrating a social heat map displayed superimposed on a map image on a monitor of a mobile terminal in the possession of a user.

FIG. 14A is a front view illustrating a mobile terminal 18 in the possession of a user who has requested a social heat map.

For example, by starting up a map application (including a GPS function) installed in the mobile terminal 18, a map image 18A of the surroundings of the current position is displayed at a preset scale, and a marker 18B indicating the current position is also displayed on the monitor 18M.

When, for example, a social heat map is requested using a different window while in this state, regions 18C with different intensities or colors are displayed superimposed on the map image 18A that is currently being displayed. Namely, the regions 18C are displayed at locations where there is a large quantity of information applicable to the user's category.

In this case, the more applicable an object is to the relevant category, the greater the intensity of display. Note that with the intensity, the display color may be changed from red, through yellow, and then to green in a sequence corresponding to the sequence from high intensity to low intensity.

As illustrated in FIG. 14B, in cases in which a location or the like that is particularly recommended for the user's category is present, a special marker 18D (a star in this case) may be displayed.

As previously described, the present exemplary embodiment may be utilized for the purpose of urban development, in order to ascertain the potential of a particular area using a social heat map and select candidates for future business development, or to select locations to introduce measures to boost existing redevelopment districts.

Alternatively, an architectural designer may utilize the present exemplary embodiment to ascertain the potential of a project site using a social heat map, and to reflect this in a traffic flow plan or in building exterior planning in order to maximize the impact in a particular area.

Alternatively, an architectural designer may utilize the present exemplary embodiment to ascertain the potential of a project site using a social heat map, and to reflect this in a traffic flow plan or in building exterior planning in order to minimize the effect on a particular area.

Alternatively, an information service may develop an application enabling deployment of a social heat map of a particular area on mobile terminals 18 (smartphones and the like) in order to encourage members to explore this particular area. So doing may provide indirect health benefits.

Modified Example

In the present exemplary embodiment, text mining developed specifically for text is performed on the posted information (comment) to identify the post origin position, determine the level of credibility, evaluate targets, and so on. However, the posted information may include an image, or may be configured solely of an image.

Although some images are not relevant, as a modified example, an image may be analyzed to generate text describing the image, which may then be handled similarly to a comment in the present exemplary embodiment.

Figure 16:
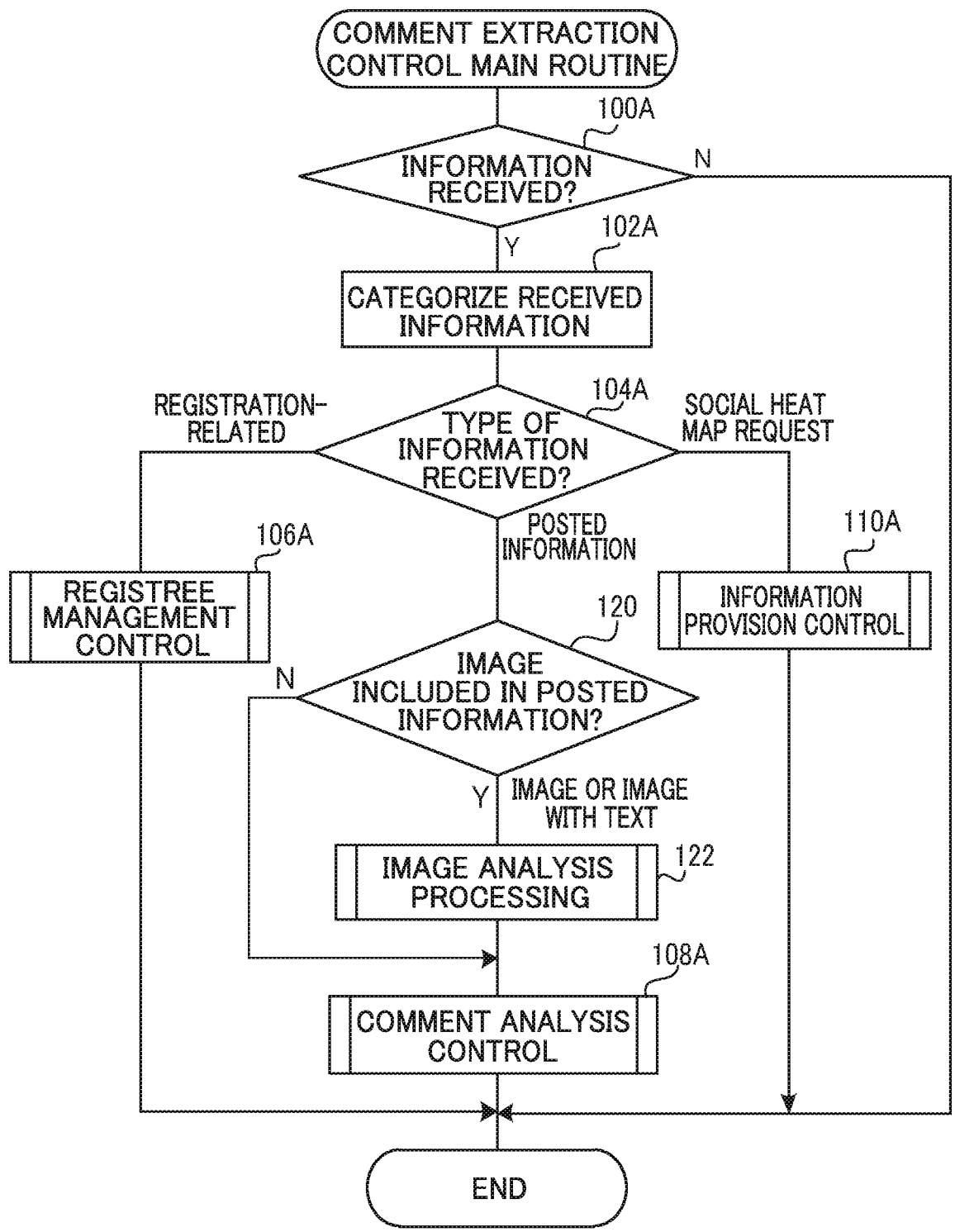
FIG. 16 is a control flowchart illustrating a main routine of a posted information extraction control device according to a modified example of an exemplary embodiment.
Figure 17:
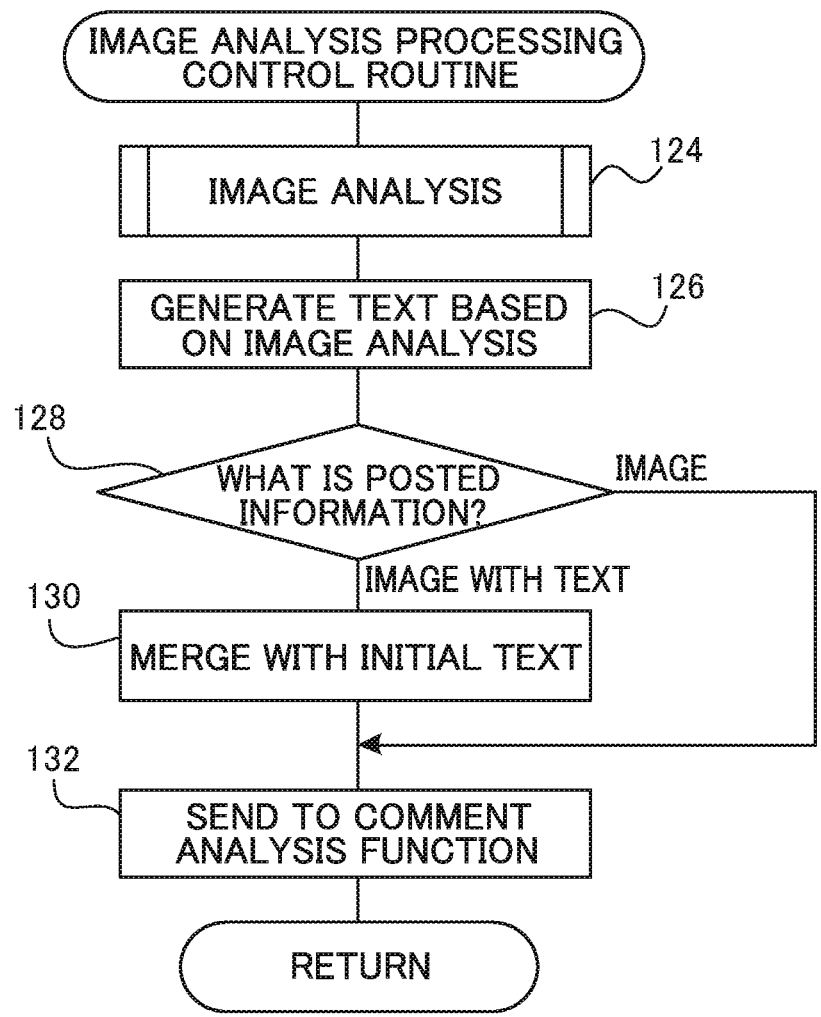
FIG. 17 illustrates an image analysis processing control routine executed at step 122 in FIG. 16.

Explanation follows regarding a modified example of the present exemplary embodiment, with reference to FIG. 15 to FIG. 17. Note that configuration portions that are the same as those in the present exemplary embodiment are appended with the same reference numerals, and explanation of the configurations thereof is omitted.

FIG. 15 is a block diagram to explain functionality of a posted information extraction control device according to the modified example of the present exemplary embodiment.

As illustrated in FIG. 15, an image analysis function 29 is connected to the comment analysis function 28.

The image analysis function 29 primarily executes object detection and conversion to text using image captioning.

In the object detection, an image (region) of an object with a distinguishing feature is extracted from the image, and the extracted image is categorized (vehicle, animal, building, etc.) to generate character-based information.

Image captioning is used the express a situation in (the content of) an image as a character string.

Namely, the object detection and image captioning both correspond to functionality to convert the image to text, and a character string (comment) created by the text conversion is analyzed by the comment analysis function.

FIG. 16 is a control flowchart illustrating a main routine of the posted information extraction control device according to the modified example of the present exemplary embodiment. Note that processing that is the same as that in the main routine of the posted information extraction control device of the present exemplary embodiment is suffixed with the reference numeral A.

At step 100A, determination is made as to whether or not information has been received. In cases in which determination is negative, the present routine is ended.

In cases in which determination is affirmative at step 100A, processing transitions to step 102A. The received information is categorized, and processing transitions to step 104A.

At step 104A, the processing branches according to the type of information received. Namely, in cases in which the type of information received at step 104A is determined to be registration-related, processing transitions to step 106A, and registree management control (illustrated in detail in FIG. 4) is executed before ending the present routine.

In cases in which the type of information received at step 104A is determined to be a posted comment, processing transitions to step 120, and determination is made as to whether or not the posted information includes an image.

In cases in which determination is affirmative at step 120, processing transitions to step 122, image analysis processing is executed, and processing transitions to step 108A.

At step 108A, comment analysis control (illustrated in detail in FIG. 5) is executed, and the present routine is ended.

In cases in which the type of information received at step 104A is determined to be a social heat map request, processing transitions to step 110A, and information provision control (illustrated in detail in FIG. 6) is executed before ending the present routine.

FIG. 17 illustrates an image analysis processing control routine executed at step 122 in FIG. 16.

At step 124, image analysis (i.e. at least one out of object detection or image captioning) is executed, after which processing transitions to step 126, and text is generated based on the image analysis. Note that the text generated based on the image is referred to as image analysis text in order to differentiate from text that is present initially.

Next, at step 128, determination is made as to whether the posted information is an image with text, or just an image.

In cases in which the posted information is determined to be an image with text at step 128, processing transitions to step 130. The image analysis text is merged with the initial text, and then processing transitions to step 132. The merged texts are sent to the comment analysis function 28 as a comment, the present routine is ended, and processing transitions to step 108A in FIG. 16.

In cases in which the posted information is determined to be just an image at step 128, processing transitions to step 132. The image analysis text is sent to the comment analysis function 28 as a comment, the present routine is ended, and processing transitions to step 108A in FIG. 16.

FIG. 18 illustrate an example of an image caption created during image analysis.

FIG. 18A illustrates a source image 80. As illustrated in FIG. 18B, distinctive images are extracted from the source image 80. In this example, an image of a cat (within a dotted line frame 80A) and an image of a ball (within a single-dotted dashed line frame 80B) have been extracted.

As illustrated in FIG. 18C, image analysis text is generated based on the extracted distinctive images. In this example, the image analysis text "A cat laying on the chair with a ball" is generated.

The entire content of the disclosure of Japanese Patent Application No. 2018-116210 filed on Jun. 19, 2018 is incorporated by reference in the present specification. All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A posted information extraction control device comprising:
   at least one processor that is configured to:
   acquire posted information that includes at least one of characters or an image and that has been submitted over a network and includes position information for a submission origin of the posted information;
   perform natural language analysis on the acquired posted information to select first posted information from the posted information, the first posted information including character string information of a location character string indicating a position;
   split the first posted information into individual words and determine respective parts of speech of the individual words using machine learning;
   certify whether the first posted information is submitted from within a given area based on one or more tenses of the respective parts of speech of the individual words, wherein the given area is related to the position indicated by the character string information;
   extract, as second posted information, a part of the first posted information that is certified as submitted within the given area and that includes selected information, which is selected as relating to a target present within the given area;
   receive longitude-latitude information that has been generated from sensor data on a user device that is a submission origin of the posted information, the longitude-latitude information having been automatically embedded in the position information included in the posted information;
   compare the longitude-latitude information with the character string information indicating the position and generating thereby a comparison result;
   determine a credibility of the position, which is indicated by the character string information, based on the comparison result, request a user to provide a response to a predetermined statement upon registration by the user, analyze the response and classify the user into a category of a plurality of user categories; and provide a social heat map including a density level of a subset of the selected information, which relates to the target present within the given area, that corresponds to the category into which the user was classified.

2. The posted information extraction control device of claim 1, wherein:

the selected information relating to the target further includes action information indicating an action with respect to the target and includes evaluation information indicating an opinion about the target; and a graded evaluation is set based on a sensory expression in the character string information in the second posted information for at least the evaluation information.

3. The posted information extraction control device of claim 1, wherein the processor is configured to:

determine whether the posted information has a high level of credibility based on the credibility of the position, include the posted information in a comment database when the posted information has the high level of credibility, and exclude the posted information from the comment database when the posted information lacks the high level of credibility.

4. The posted information extraction control device of claim 1, wherein the processor is configured to:

link the target with the selected information relating to the target and sort the target into a plurality of predetermined categories.

5. The posted information extraction control device of claim 1, wherein the processor is configured to:

in cases in which the posted information includes an image, perform image analysis including at least one of object detection or image captioning, in order to generate character string information describing the image.

6. A non-transitory computer readable storage medium storing a posted information extraction control program configured to cause a computer to operate as the posted information extraction control device of claim 1.

7. The posted information extraction control device of claim 1, wherein the processor is configured to:

send instructions to a user device that cause a display of a user device to display the social heat map.

* * * * *